(12) United States Patent
Matsuda et al.

(10) Patent No.: US 11,850,751 B2
(45) Date of Patent: Dec. 26, 2023

(54) CONTROL DEVICE, CONTROL METHOD, AND CONTROL SYSTEM

(71) Applicant: SONY CORPORATION, Tokyo (JP)

(72) Inventors: Yasuhiro Matsuda, Tokyo (JP); Kenichiro Nagasaka, Tokyo (JP); Hiromasa Masuda, Tokyo (JP); Kazuo Hongo, Chiba (JP)

(73) Assignee: SONY CORPORATION, Tokyo (JP)

( * ) Notice: Subject to any disclaimer, the term of this patent is extended or adjusted under 35 U.S.C. 154(b) by 404 days.

(21) Appl. No.: 17/258,857

(22) PCT Filed: Jul. 8, 2019

(86) PCT No.: PCT/JP2019/026927
§ 371 (c)(1),
(2) Date: Jan. 8, 2021

(87) PCT Pub. No.: WO2020/017370
PCT Pub. Date: Jan. 23, 2020

(65) Prior Publication Data
US 2021/0323148 A1    Oct. 21, 2021

(30) Foreign Application Priority Data
Jul. 17, 2018  (JP) ................................. 2018-134482

(51) Int. Cl.
*B25J 9/16*     (2006.01)
*B25J 13/08*    (2006.01)

(52) U.S. Cl.
CPC .......... *B25J 9/1633* (2013.01); *B25J 9/1607* (2013.01); *B25J 9/1674* (2013.01); *B25J 13/085* (2013.01)

(58) Field of Classification Search
CPC ...... B25J 9/1607; B25J 9/1674; B25J 9/1628; B25J 9/1633; B25J 13/085;
(Continued)

(56) References Cited

U.S. PATENT DOCUMENTS 5,056,038 A  * 10/1991  Kuno ..................... B25J 9/1633
                                                                700/45
9,375,841 B1 *  6/2016  Kemper ................. B25J 13/085
(Continued)

FOREIGN PATENT DOCUMENTS

JP   H11-77580 A    3/1990
JP   3300625 B2 *  7/2002 ............ B25J 9/1687
(Continued)

*Primary Examiner* — Adam R Mott
*Assistant Examiner* — Sagar KC
(74) *Attorney, Agent, or Firm* — Paratus Law Group, PLLC

(57) ABSTRACT

Provided is a control device capable of controlling the operation of a control target according to a detected external force. A control device (200) includes a control unit (210-1) that compares a first external force detected by a force sensor provided in a control target and a second external force estimated on the basis of a torque detected by a torque sensor provided in an a movable portion of the control target, the movable portion enabling the force sensor to be movable, and controls the operation of the control target by correcting a torque command value on the basis of a result of the comparison.

15 Claims, 13 Drawing Sheets

(58) Field of Classification Search
CPC .......... G05B 2219/39392; G05B 2219/40201; G05B 2219/40493
See application file for complete search history.

(56) References Cited

U.S. PATENT DOCUMENTS

| | | | | |
|---|---|---|---|---|
| 2005/0184697 | A1* | 8/2005 | Iribe | B25J 9/1633 |
| | | | | 318/568.12 |
| 2010/0234999 | A1* | 9/2010 | Nakajima | B25J 9/1628 |
| | | | | 700/245 |
| 2012/0330198 | A1* | 12/2012 | Patoglu | A61H 1/0281 |
| | | | | 601/33 |
| 2015/0367510 | A1* | 12/2015 | Naitou | B25J 9/1676 |
| | | | | 901/9 |
| 2016/0375588 | A1* | 12/2016 | Ueberle | B25J 9/0081 |
| | | | | 700/258 |
| 2017/0028565 | A1* | 2/2017 | Matsudaira | B25J 9/1674 |
| 2018/0370031 | A1* | 12/2018 | Schmitz | B25J 9/1676 |
| 2019/0145798 | A1* | 5/2019 | Kamiya | B25J 9/1694 |
| | | | | 700/258 |

FOREIGN PATENT DOCUMENTS

| | | | |
|---|---|---|---|
| JP | 2010-105138 A | | 5/2010 |
| JP | 2016-190292 A | | 11/2016 |
| JP | 2017-124455 A | | 7/2017 |
| KR | 101329853 B1 | * | 11/2013 |
| WO | WO 2017/044965 A1 | | 3/2017 |

* cited by examiner

⟨EXAMPLE OF STEP-SHAPED CHANGE IN GAIN α⟩

CONTROL DEVICE, CONTROL METHOD, AND CONTROL SYSTEM

CROSS REFERENCE TO PRIOR APPLICATION

This application is a National Stage Patent Application of PCT International Patent Application No. PCT/JP2019/026927 (filed on Jul. 8, 2019) under 35 U.S.C. § 371, which claims priority to Japanese Patent Application No. 2018-134482 (filed on Jul. 17, 2018), which are all hereby incorporated by reference in their entirety.

TECHNICAL FIELD

The present disclosure relates to a control device, a control method, and a control system.

BACKGROUND ART

In recent years, technologies related to robots that coexist and cooperate with persons are attracting attention. As an example of the technologies, a technology of controlling the operation of a robot has begun to spread.

PTL 1 discloses a technology of correcting an operation of a robot on the basis of an external force or the like applied to the robot detected by a sensor provided in the robot to suppress vibration occurring in the robot.

CITATION LIST

Patent Literature

[PTL 1]
JP 2017-124455 A

SUMMARY

Technical Problem

The above-mentioned technology can suppress vibration occurring in a robot by position control, for example, when the robot comes into contact with a surrounding person, object, or the like. However, since the technology does not control the force of the robot, it is not possible to suppress impact or the like that the robot applies to a person, an object, or the like, and the robot may injure a person and damage a surrounding object. Therefore, it is desirable that the robot performs such an operation that suppresses an impact applied to a person, an object, or the like by controlling the force of the robot or causing the robot to perform a passive operation when the robot comes into contact with a surrounding person, object, or the like.

Therefore, the present disclosure proposes new and improved control device, control method, and control system capable of controlling an operation of a control target according to a detected external force.

Solution to Problem

According to the present disclosure, there is provided a control device including: a control unit that compares a first external force detected by a force sensor provided in a control target and a second external force estimated on the basis of a torque detected by a torque sensor provided in a movable portion of the control target operating the force sensor and corrects the torque command value on the basis of a comparison result to control an operation of the control target.

According to the present disclosure, there is provided a control method executed by a processor, including: comparing a first external force detected by a force sensor provided in a control target and a second external force estimated on the basis of a torque detected by a torque sensor provided in a movable portion of the control target operating the force sensor and correcting the torque command value on the basis of a comparison result to control an operation of the control target.

According to the present disclosure, there is provided a control system including: an arm device including a movable portion having an actuator, an arm portion in which a plurality of links are connected by the movable portion, a torque sensor that detects a torque applied to the movable portion, and a force sensor that detects a first external force applied to a tip end of the arm portion; and a control device including a control unit that compares the first external force and a second external force estimated on the basis of the torque and corrects a torque command value on the basis of a comparison result to control an operation of the arm device.

Advantageous Effects of Invention

As described above, according to the present disclosure, it is possible to control the operation of a control target according to a detected external force.

Note that the effects described above are not necessarily limitative. With or in the place of the above effects, there may be achieved any one of the effects described in this specification or other effects that may be grasped from this specification.

DESCRIPTION OF EMBODIMENTS

Figure 1:
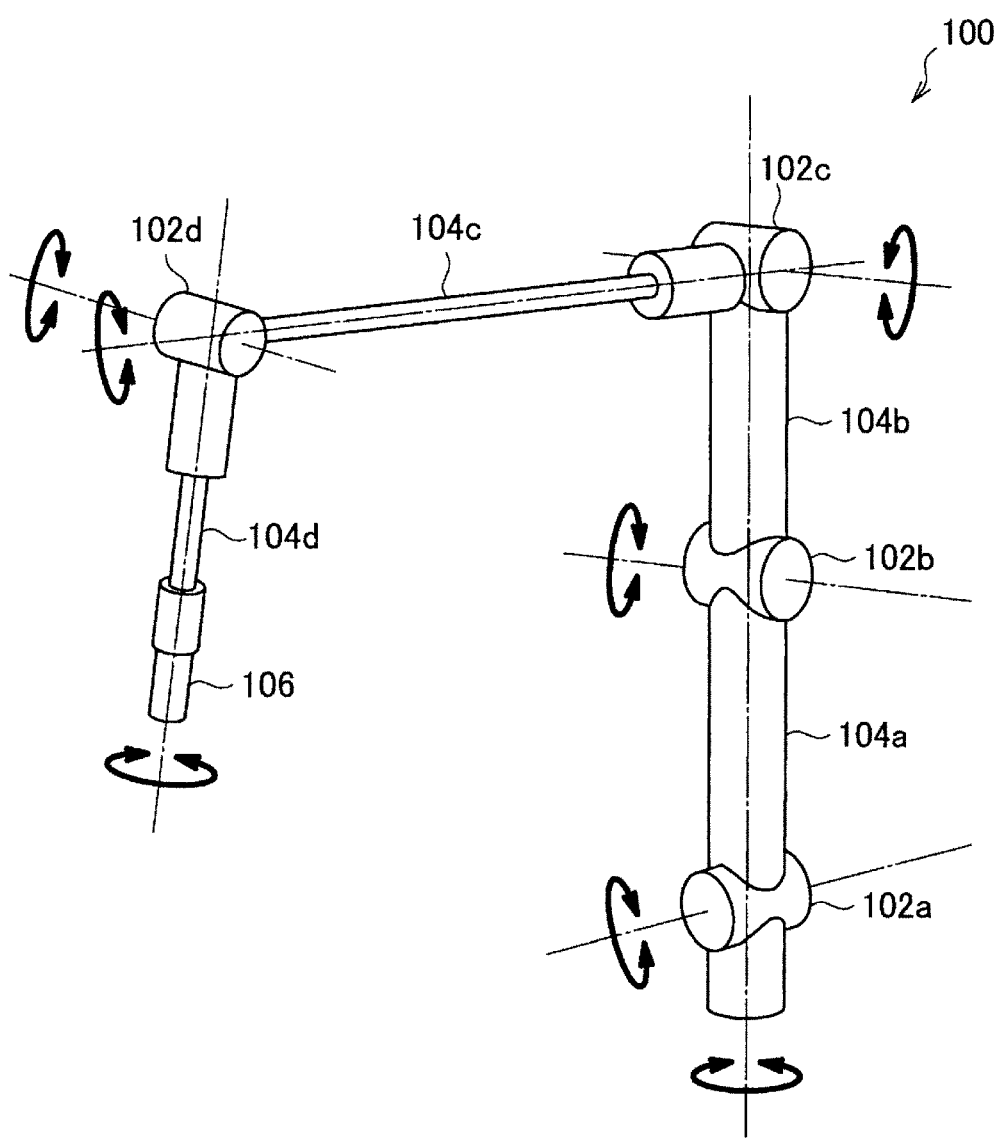
FIG. 1 is a diagram illustrating an overall configuration of an arm device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Overview
2. First Embodiment
2.1. Configuration example
2.2. Operation example
3. Second Embodiment
3.1. Configuration example
3.2. Operation example
4. Third Embodiment
4.1. Configuration example
4.2. Operation example
5. Fourth Embodiment
5.1. Configuration example
5.2. Operation example
6. Hardware configuration example
7. Conclusion

1. OVERVIEW

Hereinafter, an overview of an embodiment of the present disclosure will be described with reference to FIGS. 1 and 2. Hereinafter, an example in which a control target of a control device according to an embodiment of the present disclosure is an arm device and the control device controls an operation of the arm device will be described. The control target is not limited to the arm device.

<1. 1. Overview of Arm Device>

Figure 2:
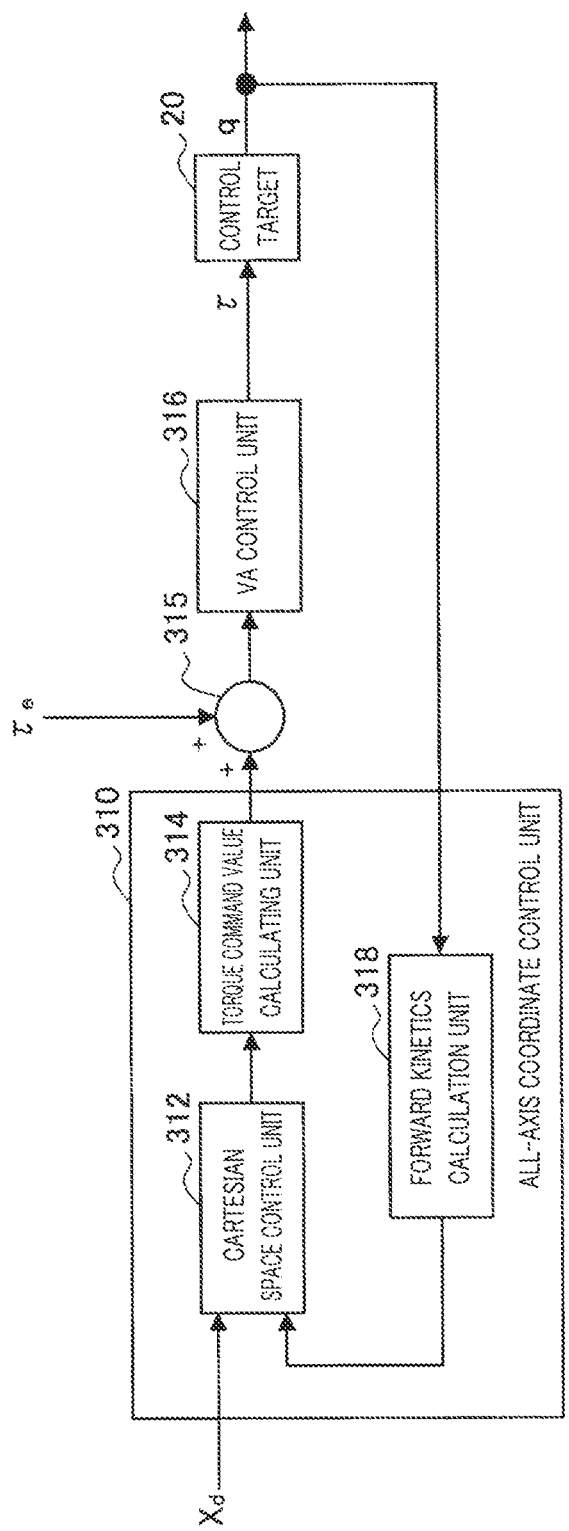
FIG. 2 is a block diagram illustrating a functional configuration example of a control unit according to a comparative example.

FIG. 1 is an explanatory diagram illustrating a schematic configuration of an arm device 100 according to an embodiment of the present disclosure. The arm device 100 includes a plurality of joint portion 102, a plurality of links 104, and a tip portion 106. As illustrated in FIG. 1, the arm device 100 includes four joint portions 102a to 102d, fourth links 104a to 104d, and one tip portion 106. The four links 104a to 104d connect the four joint portions 102a to 102d and the tip portion 106. Specifically, as illustrated in FIG. 1, the link 104a connects the joint portion 102a and the joint portion 102b. The link 104b connects the joint portion 102b and the joint portion 102c. The link 104c connects the joint portion 102c and the joint portion 102d. The link 104d connects the joint portion 102d and the tip portion 106.

The joint portion 102 has a function of rotatably connecting the plurality of links 104 to each other. For example, the joint portions 102a to 102d rotatably connect the links 104a to 104d to each other. The operation of the arm device 100 is controlled by the joint portions 102a to 102d rotating and operating. Here, in the following description, the position of each constituent member of the arm device 100 means the position (coordinate) in a space defined for operation control, and an attitude of each constituent member means the direction (angle) with respect to an arbitrary axis in a space defined for operation control. In the following description, the operation (or operation control) of the arm device 100 means that the position and attitude of each constituent member of the arm device 100 is changed (the change is controlled) by performing the operation (or the operation control) of the joint portions 102a to 102d.

The joint portion 102 and the link 104 each have a movable portion that rotates in relation to a predetermined rotation axis. For example, the joint portion 102 and the link 104 each have an actuator and rotate in relation to a predetermined rotation axis by driving of the actuator. When the rotations of the joint portion 102 and the link 104 are controlled, the operation of the arm device 100 such as, for example, extending, contracting (folding), and twisting of the arm device 100 is controlled. The arm device 100 according to the present embodiment includes eight degrees of freedom (DoF) since it has a movable portion in the four joint portions 102a to 102d and the four links 104a to 104d. Therefore, the arm device 100 is an arm device having redundancy degrees of freedom since it generally has six degrees of freedom (three degrees of freedom for position+ three degrees of freedom) or higher required for controlling the position and attitude of the robot arm.

In the above-described example, the arm device 100 includes four joint portions 102, four links 104, and eight movable portions. However, the numbers of the joint portions 102, the links 104, and the movable portions are not particularly limited. For example, the numbers of the joint portions 102, the links 104, and the movable portions of the arm device 100 may be set appropriately so that a desired degree of freedom is realized by taking the degrees of freedom of the position and attitude of the tip portion 106 into consideration. Moreover, the shapes of the joint portion 102 and the link 104 and the direction and the like of the rotation axis of the joint portion 102 are not limited to the example illustrated in FIG. 1. The shape, the direction, and the like may be set appropriately so that a desired degree of freedom is realized by taking the degrees of freedom of the position and attitude of the tip portion 106 into consideration.

In an embodiment of the present disclosure, a virtualized actuator (VA) is provided as the actuator provided in the joint portions 102a to 102d. The virtualized actuator is an actuator unit in which a motor, an encoder, a decelerator, and a torque sensor are integrated. The virtualized actuator can control (hereinafter also referred to as VA control) the operation of a joint portion so that the joint portions 102a to 102d perform ideal response and can obtain a response according to a theoretical model. In this way, the arm device 100 can perform an operation that is passive to an external force applied to the arm device 100. For details of the virtualized actuator, refer to WO 2015/046081 which is a prior patent application by the applicant of the present application.

As described above, the joint portions 102a to 102d according to the present embodiment have a rotary mechanism. Therefore, in the following description, the operation control of the joint portions 102a to 102d specifically means that the joint angle and/or the generated torque (the torque generated by the joint portions 102a to 102d) of the joint portions 102a to 102d are controlled. The generated torque can be detected by a torque sensor. For example, as in the embodiment of the present disclosure, when a virtualized actuator is used as an actuator, the generated torque is detected by a torque sensor provided in the virtualized actuator. On the other hand, when a general actuator is used, since the generated torque cannot be detected by itself, a torque sensor may be separately provided in the joint portions 102a to 102d.

The links 104a to 104e are rod-shaped members and are connected by the joint portion 102. For example, the joint portion 102a rotatably connects the link 104a and the link 104b. Moreover, the joint portion 102b rotatably connects the link 104b and the link 104c. Moreover, the joint portion 102c rotatably connects the link 104c and the link 104d. Moreover, the joint portion 102d rotatably connects the link 104d and the link 104e.

Various tip units may be provided at the tip portion 106 of the arm device 100. In an embodiment of the present disclosure, a sensor device is provided as the tip unit, for example. The sensor device may include various sensors. For example, the sensor device may include a camera, a thermo camera, a depth sensor, a microphone (hereinafter also referred to as a mike), a pressure sensor, an electrostatic sensor, a strain sensor, a force sensor, an inertia sensor, and a biosensor. The tip portion 106 may include one or a combination of these sensors as the sensor device and may include a plurality of sensor devices of the same type. The tip portion 106 of an embodiment of the present disclosure includes a force sensor as the sensor device.

The camera is an imaging apparatus such as an RGB camera that has a lens system, a driving system, and an imaging device, and captures images (still images or moving images). The thermo camera is an imaging apparatus that captures an image including information indicating the temperature of an imaging target using infrared rays or the like. The depth sensor is a device that acquires depth information, such as an infrared range finder, an ultrasonic range finder, a laser imaging detection and ranging (LiDAIR), or a stereo camera. The mike is a device that collects ambient sound and outputs audio data converted into a digital signal via an amplifier and an analog digital converter (ABC). The pressure sensor is a device that detects pressure applied from the outside. The electrostatic sensor is a device that detects a change in capacitance and is a device that can detect the proximity of a person body or the like, for example. The strain sensor is a device that detects extension or contraction generated by a tensile force or a compressive force applied from the outside. The force sensor is a device that detects forces and moments. The inertial sensor is a device that detects acceleration and an angular velocity. The biosensor is a device that detects biological information such as heartbeat and body temperature.

An end-effector may be provided at the tip portion 106 as the tip unit. The end-effector may include a hand, a gripper, and the like, for example.

The schematic configuration of the arm device 100 has been described with reference to FIG. 1. The operation of the joint portion 102 of the arm device 100 is controlled by a control device that controls the arm device 100 integrally. The control device may be provided in the arm device 100 and may be provided as an external server or the like connected to the arm device 100 via a network. Hereinafter, a control unit according to a comparative example will be described with reference to FIG. 2.

<1. 2. Control of Arm Device>

Hereinafter, prior to description of the control unit according to an embodiment of the present disclosure, a control unit according to a comparative example will be described first. FIG. 2 is a block diagram illustrating a functional configuration example of a control unit 310 according to a comparative example. A control unit 310 having the functional configuration illustrated in FIG. 2 is an example of a control unit that integrally controls the arm device 100. As illustrated in FIG. 2, the control unit 310 includes a Cartesian space control unit 312, a torque command value calculating unit 314, a correction unit 315, a VA control unit 316, and a forward kinetics calculation unit 318.

The control unit 310 has the Cartesian space control unit 312 and the torque command value calculating unit 314 as upper blocks for calculating a command value for controlling the control target 20 (the arm device 100). With the two blocks, an all-axis coordinate control system for determining the position and attitude of the entire arm device 100 is constructed. The Cartesian space control unit 312 calculates a command acceleration value (a second-order differential value of a current position attitude x) in a Cartesian space on the basis of the current position attitude x indicating the current position and attitude of the arm device 100 and a target position attitude $x_d$ indicating the target position and attitude when the arm device 100 is operated. The current position attitude x is calculated by the forward kinetics calculation unit 318 performing forward kinetics calculation based on a joint angle q of the joint portion 102 of the arm device 100. The torque command value calculating unit 314 converts the command acceleration value (the second-order differential value of the current position attitude x) calculated by the Cartesian space control unit 312 to a command value $\tau_a$ (hereinafter also referred to as a torque command value $\tau_a$) in a joint space.

The control unit 310 includes the correction unit 315 and the VA control unit 316 as lower blocks for controlling the operation of the control target 20 on the basis of the torque command value $\tau_a$ calculated by the upper blocks. The correction unit 315 corrects the torque command value $\tau_a$ using an external torque $\tau_e$ applied from the outside, detected by a torque sensor. Specifically, the correction unit 315 corrects the torque command value $\tau_a$ by adding the external torque $\tau_e$ to the torque command value $\tau_a$. The correction unit 315 outputs the corrected torque command value τ to the VA control unit 316. The VA control unit 316 outputs, to the motor command portion of the arm device 100, the torque command value τ (hereinafter also referred to as a final torque command value τ) in which the external torque is added and passiveness is taken into consideration. The arm device 100 operates the joint portion 102 on the basis of the final torque command value τ input from the VA control unit 316. A joint angle q after operation of the joint portion 102 is output to the forward kinetics calculation unit 318. In this way, the arm device 100 can perform an operation that is passive to an external force.

As described above, by performing VA control on the arm device 100, the stability of the operation of the arm device 100 is improved. However, in the configuration of the control unit 310, while the stability is improved by VA control, there is a problem that the accuracy of the operation of the arm device 100 decreases. The main cause of the decrease in operation accuracy may be the external torque $\tau_e$ detected by the torque sensor. This is because the external torque $\tau_e$ is a command value in a VA control system but acts as a disturbance in an all-axis coordinate control system.

Another example of the cause of the decrease in the operation accuracy is a design error of the arm device 100, a calculation error, and the like. Force and moment in a work space are calculated on the basis of the external torque $\tau_e$ detected by the torque sensor of the joint portion 102, the attitude of the arm device 100, a configuration of the arm device 100, and the like. Therefore, when an error occurs in the calculated force and moment due to a design error of the arm device 100, a calculation error, and the like, the operation accuracy of the arm device 100 decreases.

Embodiments of the present disclosure are conceived by focusing on this point. In embodiments of the present disclosure, a technology capable of controlling an operation of a control target according to a detected external force is proposed. For example, a control system capable of switching an operation mode when operating a control target according to a detected external force is proposed. Specifically, the control system controls switching between a high-accuracy mode in which a control target performs a highly accurate operation (first operation) and a high-safety model in which a control target performs a highly safe operation (second operation).

The control system includes the arm device 100 including the joint portion 102 having an actuator and a torque sensor that detects a torque and an arm portion in which the plurality of links 104 are connected by the joint portion 102. Moreover, a force sensor that detects a measurement value (first external force) of an external force applied to the tip portion 106 is provided in the tip portion 106 of the arm portion of the arm device 100. Furthermore, the control system includes a control device having a control unit that controls the operation of the arm device 100. The control unit compares the measurement value of the external force and an estimation value (second external force) of the external force estimated on the basis of an external torque and kinetics calculation and corrects a torque command value calculated on the basis of the movement purpose (control command) to the arm device 100 on the basis of the comparison result to control the operation of the arm device 100.

Specifically, the control unit adjusts a gain on the basis of a comparison result between a measurement value of an external force and an estimation value of the external force and corrects the torque command value by applying the gain. More specifically, the control unit applies the gain by multiplying an estimated torque estimated on the basis of a torque, an attitude of the arm device 100, and kinetics calculation by the gain. The control unit corrects the torque command value on the basis of a value obtained by multiplying the estimated torque by the gain.

An overview of an embodiment of the present disclosure has been described with reference to FIGS. 1 and 2. Next, a first embodiment will be described.

2. FIRST EMBODIMENT

Hereinafter, a first embodiment will be described. In the first embodiment, a high-safety model is realized by VA control using data detected by a torque sensor. Moreover, in the first embodiment, it is assumed that a high-accuracy mode is realized by impedance control using data detected by a force sensor.

<2. 1. Configuration Example>

Hereinafter, a configuration example according to the first embodiment will be described with reference to FIGS. 3 to 8.

<2. 1. 1. Configuration Example of Control System 10>

Figure 3:
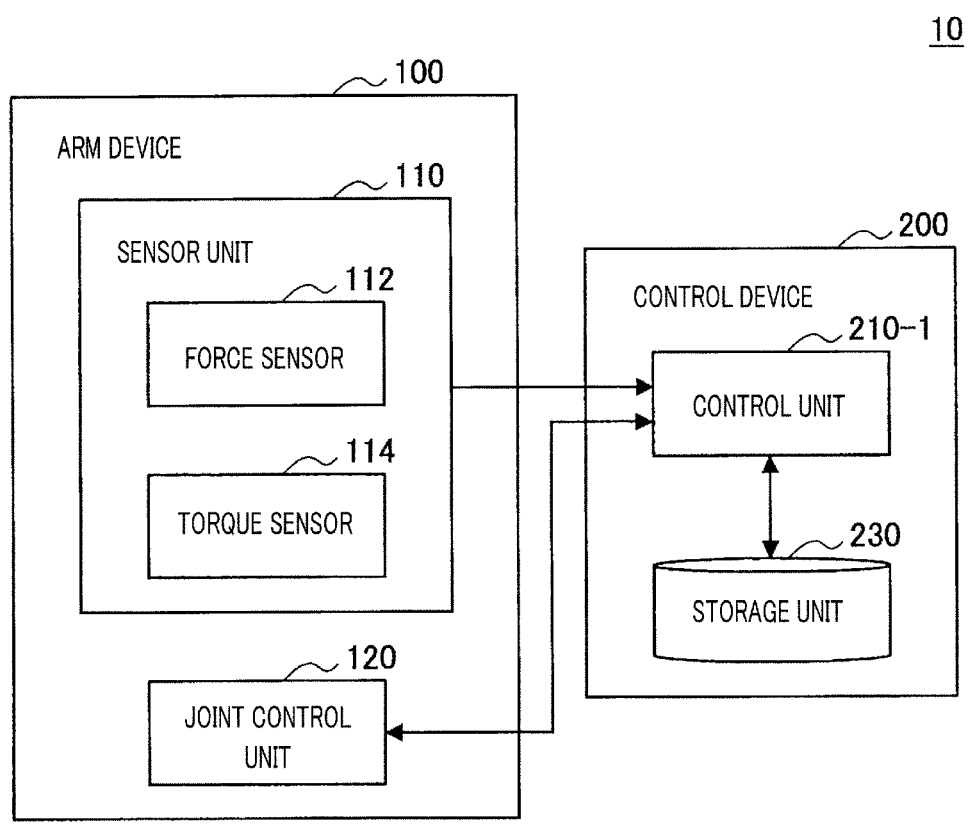
FIG. 3 is a block diagram illustrating a configuration example of a control system according to a first embodiment.

FIG. 3 is a block diagram illustrating a configuration example of the control system 10 according to the first embodiment. As illustrated in FIG. 3, the control system 10 may include the arm device 100 and the control device 200.

(1) Arm Device 100

As illustrated in FIG. 3, the arm device 100 may include a sensor unit 110 and a joint operating unit 120.

(1-1) Sensor Unit 110

The sensor unit 110 may include various sensors. As illustrated in FIG. 3, the sensor unit 110 includes a force sensor 112 and a torque sensor 114. The force sensor 112 is provided in the tip portion 106 of the arm device 100 and detects an external force and a moment applied to the tip portion 106. The tip portion 106 of the arm device 100 is located at a position closer to a work space where a highly accurate operation is required. Since the force sensor 112 is provided at that position, it is possible to detect the force and moment with higher accuracy than when the force sensor is provided at another position of the arm device 100. The force sensor 112 detects three-dimensional to six-dimensional external force and moments. Moreover, the force sensor 112 basically operates in response to the operation of the arm device 100 when the joint portion 102 of the arm device 100 is operated and detects data. The force sensor 112 may detect data even when the joint portion 102 of the arm device 100 is stopped. Moreover, the torque sensor 114 is provided in each of the joint portions 102a to 102d of the arm device 100 and detects the torque applied to each of the joint portions 102a to 102d. The torque sensor 114 detects one-dimensional torque around the rotation axis of the joint portion 102.

(1-2) Joint Operating Unit 120

The joint operating unit 120 has a function of operating the joint portion 102. For example, the joint operating unit 120 operates the joint portion 102 on the basis of the final torque command value τ input from the control device 200. The joint operating unit 120 outputs the joint angle q of the joint portion 102 after operation to the control device 200.

(2) Control Device 200

As illustrated in FIG. 3, the control device 200 may include a control unit 210-1 and a storage unit 230.

(2-1) Control Unit 210-1

The control unit 210-1 has a function of controlling the operation of the arm device 100. For example, the control unit 210-1 calculates information necessary for controlling the operation of the arm device 100 on the basis of the data detected by the sensor unit 110 of the arm device 100. Specifically, the control unit 210-1 calculates the torque command value τ for the arm device 100 on the basis of the data detected by the force sensor 112 and the torque sensor 114. Moreover, the control unit 210-1 corrects the torque command value τ as necessary on the basis of the relation between the pieces of data detected by the force sensor 112 and the torque sensor 114. For example, the control unit 210-1 corrects the torque command value using a value obtained by multiplying the estimated torque estimated on the basis of the torque, the attitude (for example, the joint angle) of the arm device 100, and kinetics calculation by the gain. The control unit 210-1 outputs the final torque command value τ which is a final torque command value to the joint operating unit 120 of the arm device 100 and causes the joint operating unit 120 to control the operation of the joint portion 102.

(2-2) Storage Unit 230

The storage unit 230 has a function of storing various pieces of data. For example, the storage unit 230 stores sensor data detected by the sensor unit 110 of the arm device 100. Moreover, the storage unit 230 stores data output in the control processing of the control unit 210-1. Moreover, the storage unit 230 stores programs such as various applications, data, and the like. The data stored in the storage unit 230 is not limited to the above-mentioned examples.

<2. 1. 2. Functional Configuration Example of Control Unit 210-1>

Figure 4:
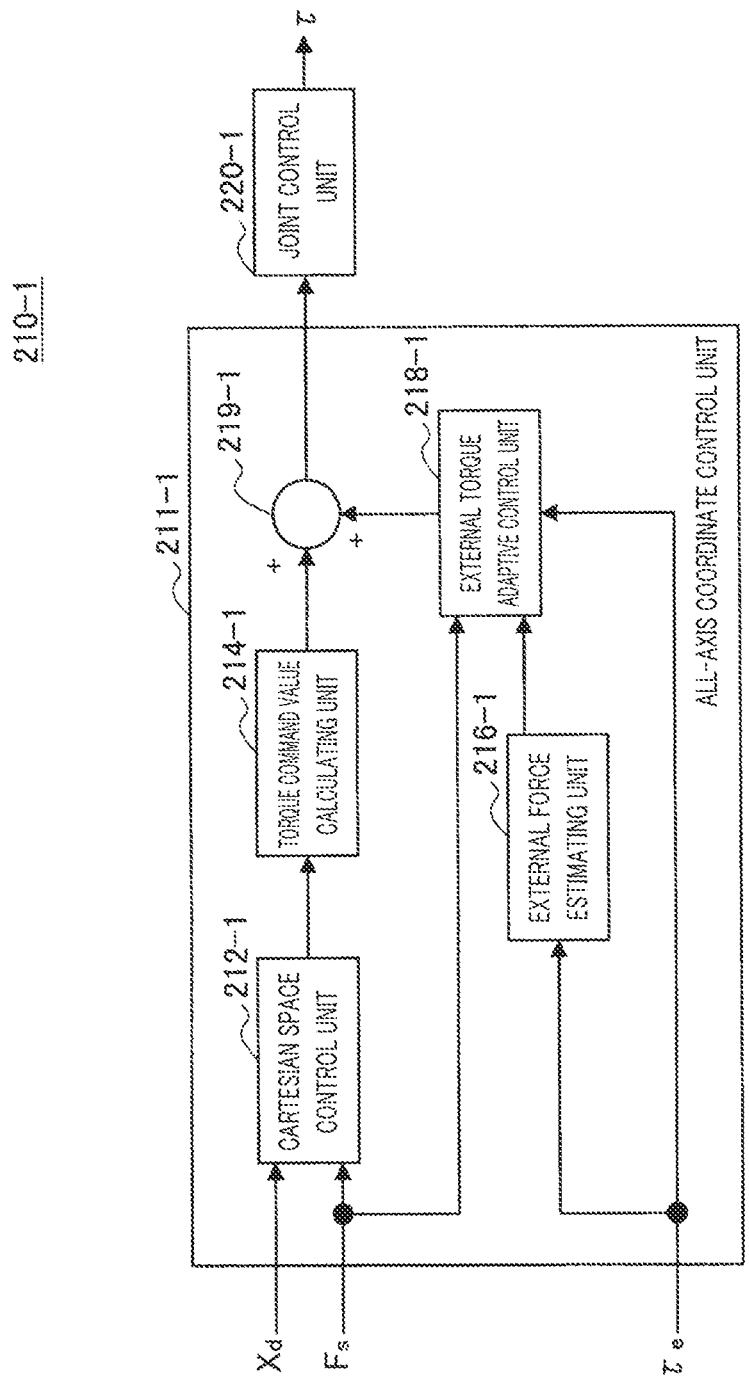
FIG. 4 is a block diagram illustrating a functional configuration example of the control unit according to the embodiment.

FIG. 4 is a block diagram illustrating a functional configuration example of the control unit 210-1 according to the first embodiment. As illustrated in FIG. 4, the control unit 210-1 includes an all-axis coordinated control unit 211-1 and a joint control unit 220-1.

(1) All-Axis Coordinated Control Unit 211-1

As illustrated in FIG. 4, the all-axis coordinated control unit 211-1 includes a Cartesian space control unit 212-1, a torque command value calculating unit 214-1, an external force estimating unit 216-1, an external torque adaptive control unit 218-1, and a correction unit 219-1.

(1-1) Cartesian Space Control Unit 212-1

The Cartesian space control unit 212-1 has a function of calculating a command value in a Cartesian space. For example, the Cartesian space control unit 212-1 calculates a command acceleration value (a second-order differential value of a current position attitude x) in a Cartesian space on the basis of the target position attitude $x_d$ indicating a target position and attitude when the arm device 100 is operated and an external force $F_s$ (a measurement value of the external force) detected by the force sensor 112 at the tip portion 106 of the arm device 100. The Cartesian space control unit 212-1 outputs the calculated command acceleration value in the Cartesian space to the torque command value calculating unit 214-1.

(1-2) Torque Command Value Calculating Unit 214-1

The torque command value calculating unit 214-1 has a function of converting the command acceleration value in the Cartesian space to a command value $\tau_a$ (torque command value $\tau_a$) in the joint space. For example, the torque command value calculating unit 214-1 calculates an angular acceleration (a second-order differential value of the joint angle q) of the joint portion 102 on the basis of the command acceleration value (the second-order differential value of the current position attitude x) calculated by the Cartesian space control unit 212-1. Subsequently, the torque command value calculating unit 214-1 calculates the torque command value $\tau_a$ on the basis of the angular acceleration (the second-order differential value of the joint angle q). The torque command value calculating unit 214-1 outputs the calculated torque command value $\tau_a$ to the correction unit 219-1.

(1-3) External Force Estimating Unit 216-1

The external force estimating unit 216-1 has a function of calculating an estimated external force $F_{ex}$ (an estimation value of the external force) estimated to be applied to the tip portion 106 of the arm device 100. For example, the external force estimating unit 216-1 performs inverse kinetics calculation on the basis of the joint angle q of the joint portion 102 of the arm device 100, an angular velocity (a differential value of the joint angle q), and an angular acceleration (a second-order differential value of the joint angle q). The external force estimating unit 216-1 calculates an external torque (represented by $\tau\hat{\ }$) which is a torque (gravity, centrifugal force, and the like) generated due to only the operation of the arm device 100 estimated to be provided in the external torque $\tau_e$. In the following description, the joint angle q, the angular velocity (the differential value of the joint angle q), and the angular acceleration (the second-order differential value of the joint angle q) are also collectively referred to as a current state of the joint portion 102. Subsequently, the external force estimating unit 216-1 calculates a difference between the external torque $\tau_e$ detected by the torque sensor and an external torque ($\tau\hat{\ }$) as an estimated external torque (estimated torque) $\tau_{ex}$. Specifically, the external force estimating unit 216-1 subtracts the external torque ($\tau\hat{\ }$) from the external torque $\tau_e$ to calculate the estimated external torque $\tau_{ex}$. In this way, since the torque generated due to only the operation of the arm device 100 is cancelled, the external force estimating unit 216-1 can calculate an external torque component generated due to collision with a person, an environment, or the like. Subsequently, the external force estimating unit 216-1 calculates the estimated external force $F_{ex}$ on the basis of the estimated external torque $\tau_{ex}$. The external force estimating unit 216-1 outputs the calculated estimated external force $F_{ex}$ to the external torque adaptive control unit 218-1.

(1-4) External Torque Adaptive Control Unit 218-1

The external torque adaptive control unit 218-1 has a function of switching between a high-accuracy mode and a high-safety model. For example, the external torque adaptive control unit 218-1 compares the external force $F_s$ and the estimated external force $F_{ex}$ to extract a difference e and detects an application state of an external force (third external force) applied to the entire arm device 100. In the following description, the external force applied to the entire arm device 100 is also referred to as an entire external force. Subsequently, the external torque adaptive control unit 218-1 switches between the high-accuracy mode and the high-safety model according to the application state. The estimated external force $F_{ex}$ used for extracting the difference e is calculated as an external torque component generated due to collision with a person, an environment, or the like in such a way that the torque (gravity, centrifugal force, and the like) generated due to only the operation of the arm device 100 is cancelled during calculation of the external force estimating unit 216-1. Therefore, when extracting the difference e, the external torque adaptive control unit 218-1 can handle the estimated external force $F_{ex}$ and the external force $F_s$ detected by the force sensor in the same level.

In an application state in which an unexpected entire external force is applied to the arm device 100, the external torque adaptive control unit 218-1 switches the operation mode to the high-safety model, for example. This means that it is determined that the two sensor systems of the force sensor 112 and the torque sensor 114 are not consistent. Therefore, the external torque adaptive control unit 218-1 switches to the high-safety model in which highly stable force control is performed using the external force $F_s$ detected by the force sensor 112 and the external torque $\tau_e$ detected by the torque sensor 114. The external torque adaptive control unit 218-1 sets the high-safety model as the operation mode, for example, by adjusting a gain α so as to approach a predetermined value (second value). Specifically, the external torque adaptive control unit 218-1 sets the gain α so as to approach 1. The external torque adaptive control unit 218-1 outputs $\alpha\tau_{ex}$ obtained by multiplying the estimated external torque $\tau_{ex}$ by the gain α to the correction unit 219-1. The value indicated by the gain α is a value in the range of $0 \le \alpha \le 1$. Moreover, an arbitrary value satisfying the condition of $0 \le \alpha \le 1$ may be set to the predetermined value (second value).

In an application state in which an expected entire external force is applied to the arm device 100, the external torque adaptive control unit 218-1 switches the operation mode to the high-accuracy mode, for example. This means that it is determined that two sensor systems of the force sensor 112 and the torque sensor 114 are consistent. Therefore, the external torque adaptive control unit 218-1 switches to the high-accuracy mode in which a highly accurate operation is performed using only the external force $F_s$ detected by the force sensor 112. The external torque adaptive control unit 218-1 sets the high-accuracy mode as the operation mode by adjusting the gain α so as to approach a predetermined value (first value), for example. Specifically, the external torque adaptive control unit 218-1 sets the gain α so as to approach 0. Moreover, the external torque adaptive control unit 218-1 may set the gain α to 0 when the two sensor systems of the force sensor 112 and the torque sensor 114 are consistent and it is expected that an operation can be performed without a danger of making contact with a surrounding person or object. In this way, the external torque adaptive control unit 218-1 can output 0 as $\alpha\tau_{ex}$ to the correction unit 219-1. That is, the external torque adaptive control unit 218-1 can invalidate the input of the external torque $\tau_e$ detected by the torque sensor. An arbitrary value satisfying the condition of $0 \leq \alpha \leq 1$ may be set to the predetermined value (first value).

The application state is detected by the external torque adaptive control unit 218-1 on the basis of comparison between the difference e and a predetermined threshold. For example, when the difference e is equal to or larger than a predetermined threshold, the application state is an application state in which an unexpected entire external force is applied to the arm device 100. When the difference ε is not equal to or larger than the predetermined threshold, the application state is an application state in which an expected entire external force is applied to the arm device 100. The determination condition of the application state is not limited to the above-described example and an arbitrary determination condition may be used.

Figure 5:
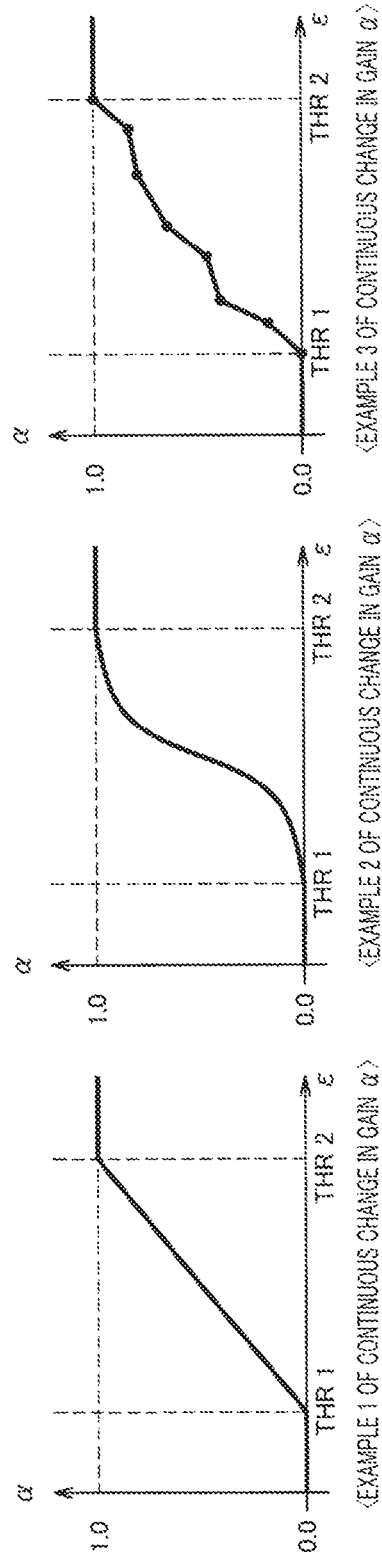
FIG. 5 is an explanatory diagram illustrating an example of a continuous change in gain according to the embodiment.

The gain α is adjusted by the external torque adaptive control unit 218-1 according to an arbitrary method on the basis of the difference ε. For example, the external torque adaptive control unit 218-1 changes the gain α in a continuous manner. Due to this, the external torque adaptive control unit 218-1 may switch between the high-accuracy mode and the high-safety model in a continuous manner. FIG. 5 is an explanatory diagram illustrating an example of continuous change in the gain according to the first embodiment. Example 1 of the continuous change in the gain α on the left side of FIG. 5 illustrates an example in which the gain α is continuously changed linearly. Example 2 of the continuous change in the gain α at the center of FIG. 5 illustrates an example in which the gain α is continuously changed polynomially. Example 3 of the continuous change in the gain α on the right side of FIG. 5 illustrates an example in which the gain α is continuously changed nonlinearly (table reference type). As illustrated in the respective examples of FIG. 5, when the difference e is a value within a predetermined range (for example, a range of a threshold THR1 to a threshold THR2), the external torque adaptive control unit 218-1 may continuously change the gain α from 0 to 1. When the difference ε is within the range of the threshold THR1 to the threshold THR2, the gain α may be continuously changed in a nonlinear functional type or a learning type. In this manner, by continuously switching the operation mode according to a continuous change in the gain α, the arm device 100 can smoothly change the operation during switching of the operation mode. In the following description, a plurality of thresholds such as the threshold THR1 and the threshold THR2 are also collectively referred to as a threshold group.

Figure 6:
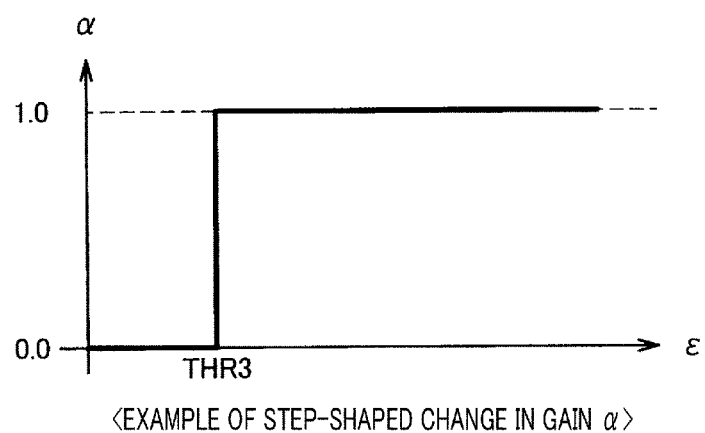
FIG. 6 is an explanatory diagram illustrating an example of a step-like change in gain according to the embodiment.

The external torque adaptive control unit 218-1 may discontinuously change the gain α. Due to this, the external torque adaptive control unit 218-1 may discontinuously switch between the high-accuracy mode and the high-safety model. FIG. 6 is an explanatory diagram illustrating an example of a step-like change in gain according to the first embodiment. As illustrated in the example of the step-like change in the gain α in FIG. 6, the external torque adaptive control unit 218-1 may change the gain α in a step shape so that the gain α is either 0 or 1 depending on whether the difference ε is equal to or larger than a predetermined threshold.

It is assumed that, when the operation mode is the high-safety model, the difference ε decreases, and it is determined that the unexpected external force $F_s$ is not applied to the arm device 100. In this case, the external torque adaptive control unit 218-1 may switch the operation mode from the high-safety model to the high-accuracy mode seamlessly. On the other hand, it is assumed that, when the operation mode is the high-accuracy mode, the difference ε increases, and it is determined that the unexpected external force $F_s$ is applied to the arm device 100. In this case, the external torque adaptive control unit 218-1 may switch the operation mode from the high-accuracy mode to the high-safety model seamlessly.

Figure 7:
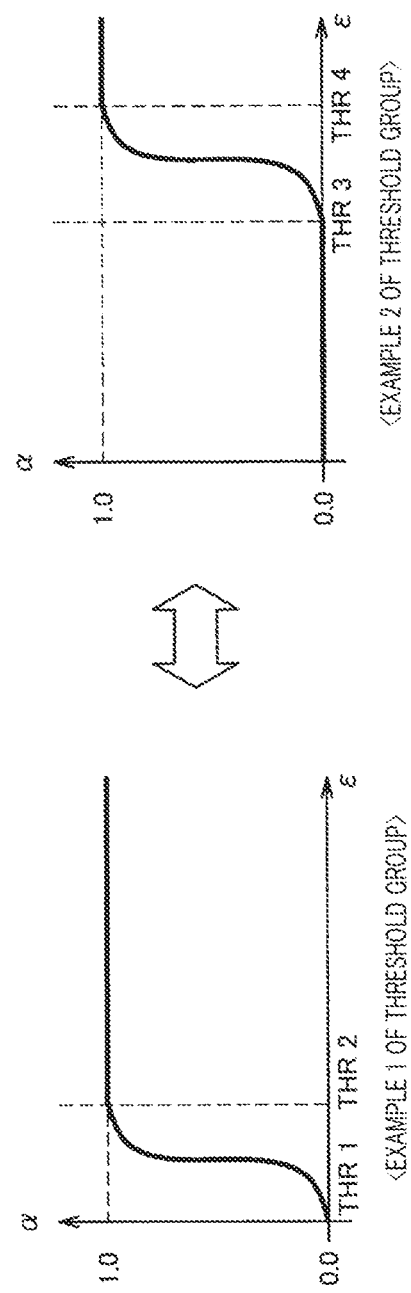
FIG. 7 is an explanatory diagram illustrating an example of a threshold group according to the embodiment.

The threshold group may be changed adaptively. FIG. 7 is an explanatory diagram illustrating an example of a threshold group according to an embodiment of the present disclosure. For example, the external torque adaptive control unit 218-1 changes the threshold group according to the content of a task commanded to the arm device 100. Specifically, when the content of a task indicates an interaction with a person and an operation in a dynamic environment, since the arm device 100 is required to perform a highly safe operation, the external torque adaptive control unit 218-1 sets THR1 and THR2 as in Example 1 of the threshold group on the left side of FIG. 7. Moreover, when the content of a task indicates an operation such as precision machining or liquid transportation, since the arm device 100 is required to perform a highly accurate operation, the external torque adaptive control unit 218-1 sets THR3 and THR4 as in Example 2 of the threshold group on the right side of FIG. 7.

The threshold group may be stored as direct values in a table in the storage unit 230 and may be represented by a function and be stored. When the threshold group is stored as direct values in a table, threshold group is stored as {THR1, THR2}, {THR3, THR4}, for example. Moreover, when the threshold group is represented by a function, the threshold group is represented as THR3=f(THR1, THR2, param), THR4=f'(THR1, THR2, param), for example.

In the above-described example, switching between two modes of the high-accuracy mode and the high-safety model as the operation mode has been described. However, the operation mode may be switched to another mode according to the content of an operation of the arm device 100. For example, the operation mode may be switched to a sensitive mode in which the arm device 100 performs a sensitive operation with respect to the unexpected external force K applied to the arm device 100. In the sensitive mode, the external torque adaptive control unit 218-1 sets the threshold group so that the number of regions where the gain α is 1.0 increases. Due to this, since the arm device 100 is likely to be influenced by the estimated external torque $\tau_{ex}$, the external torque adaptive control unit 218-1 can control operations so that the arm device 100 operates more sensitively with respect to the external force $F_s$. Moreover, the operation mode may be switched to an insensitive mode in which the arm device 100 performs an insensitive operation with respect to the unexpected external force $F_s$ applied to the arm device 100. In the insensitive mode, the external torque adaptive control unit 218-1 sets the threshold group so that the number of regions where the gain α is 0.0 increases. Due to this, since the arm device 100 is less likely to be affected by the estimated external torque $\tau_{ex}$, the external torque adaptive control unit 218-1 can control operations so that the arm device 100 operates more insensitively with respect to the external force $F_s$.

The external torque adaptive control unit 218-1 may perform machine learning on the basis of the value of the estimated external force $F_{ex}$ input from the external force estimating unit 216-1 in the past and the value of the gain $\alpha$ adjusted in the past, for example, and adjust the gain $\alpha$ on the basis of the result of the machine learning.

(1-5) Correction Unit 219-1

The correction unit 219-1 has a function of calculating the final torque command value $\tau$. For example, the correction unit 219-1 corrects the torque command value $\tau_a$ on the basis of $\alpha\tau_{ex}$ to which the gain $\alpha$ adjusted depending on the high-safety model or the high-accuracy mode is applied and calculates the final torque command value $\tau$. Specifically, when the operation mode is the high-safety model, the correction unit 219-1 corrects the torque command value $\tau_a$ by adding $\alpha\tau_{ex}$ to the torque command value $\tau_a$. Due to this, the correction unit 219-1 can calculate the final torque command value $\tau$ so that the arm device 100 performs a passive operation on the basis of the external force $F_s$ detected by the force sensor 112 and the external torque $\tau_e$ detected by the torque sensor 114. The correction unit 219-1 outputs the calculated final torque command value $\tau$ to the joint control unit 220-1.

When the operation mode is the high-accuracy mode, the correction unit 219-1 uses $\tau_a$ as the final torque command value $\tau$ as it is without using $\alpha\tau_{ex}$. Due to this, the correction unit 219-1 can calculate the final torque command value $\tau$ so that the arm device 100 performs a highly accurate operation on the basis of only the external force $F_s$ detected by the force sensor 112. The correction unit 219-1 outputs the calculated final torque command value $\tau$ to the joint control unit 220-1. Even when the operation mode is the high-accuracy mode, the correction unit 219-1 may correct the torque command value $\tau_a$ to calculate the final torque command value $\tau$ by adding the torque command value $\tau_a$ and $\alpha\tau_{ex}$.

(2) Joint Control Unit 220-1

The joint control unit 220-1 has a function of controlling the operation of the control target on the basis of the final torque command value $\tau$. When the final torque command value $\tau$ is input from the correction unit 219-1 in the high-safety model, the joint control unit 220-1 controls the operation of the joint portion 102 of the arm device 100 on the basis of the final torque command value $\tau$ so that the arm device 100 performs a passive operation. As a passive operation, for example, the joint control unit 220-1 operates the joint portion 102 so that, when the arm device 100 makes contact with a person, the arm device 100 performs an operation of moving in a direction opposite to the direction of making contact with a person so as to be separated from the person. When the final torque command value $\tau$ is input from the correction unit 219-1 in the high-accuracy mode, the joint control unit 220-1 controls the operation of the joint portion 102 of the arm device 100 on the basis of the final torque command value $\tau$ so that the arm device 100 performs a highly accurate operation. When the final torque command value $\tau$ calculated after the external torque $\tau_e$ detected by the torque sensor is invalidated is input from the correction unit 219-1, the joint control unit 220-1 can raise the control stiffness of the actuator of the joint portion 102 of the arm device 100. Due to this, the joint control unit 220-1 can cause the tip portion 106 of the arm device 100 to perform a highly accurate operation.

Hereinabove, a functional configuration example of the control unit 210-1 according to the first embodiment has been described with reference to FIGS. 3 to 7. Next, the details of the processing of each constituent components of the control unit 210-1 according to the first embodiment will be described.

<2. 1. 3. Configuration Example of Processing Block of Control Unit 210-1>

Figure 8:
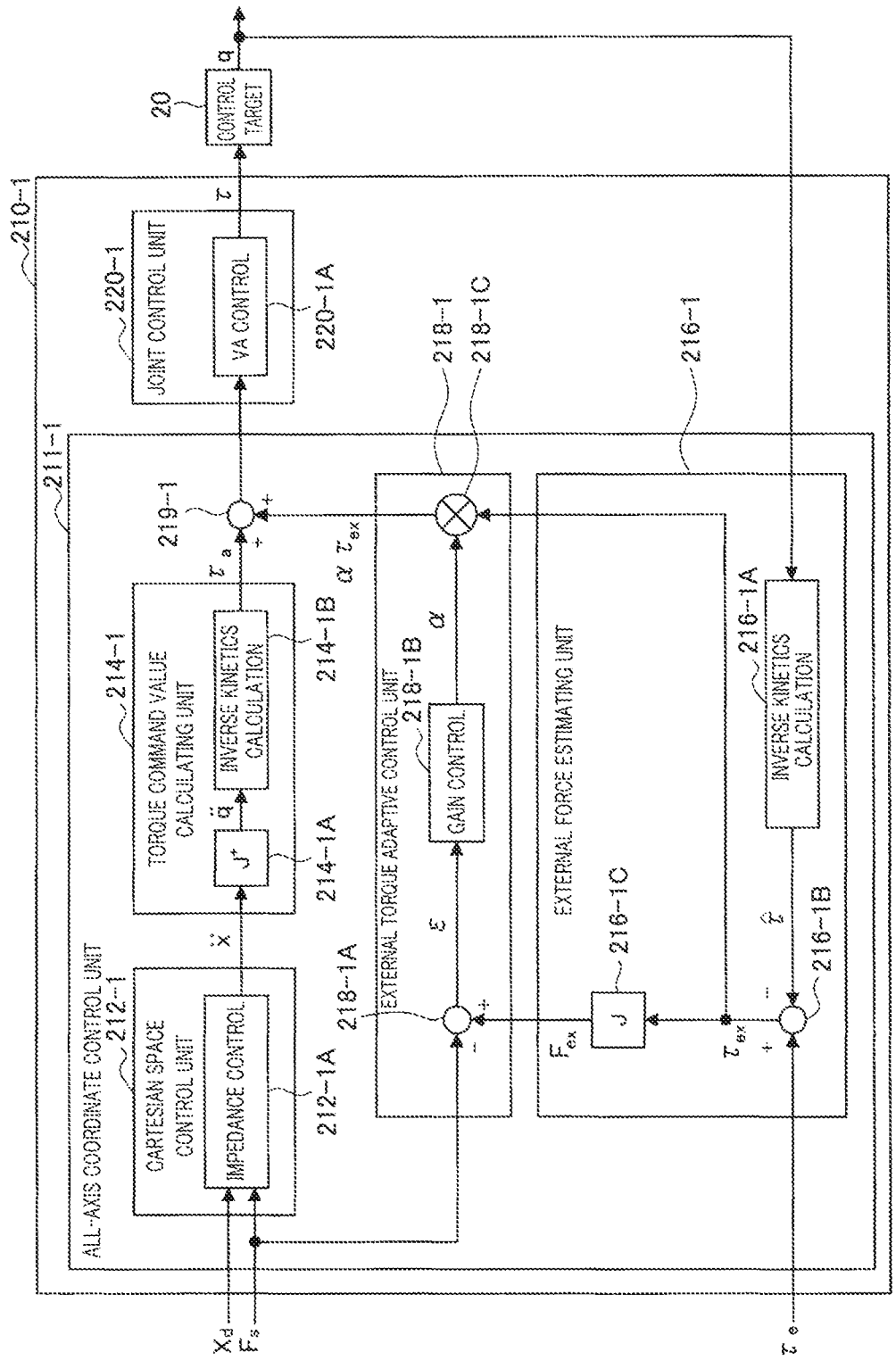
FIG. 8 is a block diagram illustrating a configuration example of processing blocks of the control unit according to the embodiment.

FIG. 8 is a block diagram illustrating a configuration example of a processing block of the control unit 210-1 according to the first embodiment. As illustrated in FIG. 8, the Cartesian space control unit 212-1 includes a processing block 212-1A. The torque command value calculating unit 214-1 includes a processing block 214-1A and a processing block 214-1B. The external force estimating unit 216-1 includes a processing block 216-1A, a processing block 216-1B, and a processing block 216-1C. The external torque adaptive control unit 218-1 includes a processing block 218-1A, a processing block 218-1B, and a processing block 218-1C. The joint control unit 220-1 includes a processing block 220-1A.

(1) Processing Block 212-1A

The processing block 212-1A performs a process of calculating a command acceleration value (the second-order differential value of the current position attitude x) in a Cartesian space. For example, the processing block 212-1A calculates a command acceleration value (the second-order differential value of the current position attitude x) in a Cartesian space on the basis of the target position attitude $x_d$ and the external force $F_s$ detected by the force sensor 112. When the current position attitude of the arm device 100 is x, the measurement value $F_s$ of the external force is represented by Equation (1) below.

[Math. 1]

$$F_s = M\ddot{x} + D(\dot{x} - \dot{x}_d) + K(x - x_d) \tag{1}$$

In Equation (1), M indicates an inertia matrix in impedance control, D indicates a viscosity matrix in impedance control, and K indicates a stiffness matrix in impedance control.

The processing block 212-1A calculates the command acceleration value (the second-order differential value of the current position attitude x) in a Cartesian space by Equation (2) below which is modified from Equation (1) as $e = (x \cdot x_d)$. The processing block 212-1A outputs the calculated command acceleration value (the second-order differential value in the current position attitude x) in a Cartesian space to the processing block 214-1A.

[Math. 2]

$$\ddot{x} = M^{-1}(F_s - D\dot{e} - Ke) \tag{2}$$

(2) Processing Block 214-1A

The processing block 214-1A performs a process of calculating an angular acceleration (the second-order differential value of the joint angle q) of the joint portion 102. For example, the processing block 214-1A calculates the angular acceleration (the second-order differential value of the joint angle q) of the joint portion 102 from the command acceleration value (the second-order differential value of the current position attitude x) in a Cartesian space using a generalized inverse matrix $J^+$ of a Jacobian matrix J. The processing block 214-1A outputs the calculated angular acceleration (the second-order differential value of the joint angle q) to the processing block 214-1B. A method of calculating the angular acceleration (the second-order differential value of the joint angle q) of the joint portion 102 in the processing block 214-1A is not limited to the method using the generalized inverse matrix $J^+$ of the Jacobian matrix J. For example, the angular acceleration (the second-order differential value of the joint angle q) of the joint portion 102 may be calculated by a method using a singularity avoidance inverse matrix.

(3) Processing Block 214-1B

The processing block 214-1B performs a process of calculating the torque command value $\tau_a$. For example, the processing block 214-1B calculates the torque command value $\tau_a$ by performing inverse dynamics (ID) calculation on the basis of the angular acceleration (the second-order differential value of the joint angle q). The processing block 214-1B outputs the calculated torque command value $\tau_a$ to the correction unit 219-1.

(4) Processing Block 216-1A

The processing block 216-1A performs a process of calculating an external torque ($\hat{\tau}$). For example, the processing block 216-1A calculates the external torque ($\hat{\tau}$) by performing inverse kinetics calculation on the basis of the joint angle q of the joint portion 102. Specifically, the processing block 216-1A detects the current state of the joint portion 102 by calculating the angular velocity (the differential value of the joint angle q) and the angular acceleration (the second-order differential value of the joint angle q) from the joint angle q of the joint portion 102. The processing block 216-1A calculated the external torque ($\hat{\tau}$) by performing inverse kinetics calculation on the basis of the current state. The processing block 216-1A outputs the calculated external torque ($\hat{\tau}$) to the processing block 216-1B. The external torque ($\hat{\tau}$) is calculated by Equation (3) below.

[Math. 3]

$$\hat{\tau}=\hat{M}(q)\ddot{q}+\hat{c}(q,\dot{q})+\hat{g}(q) \quad (3)$$

In Equation (3), $\hat{M}$ indicates an inertia matrix, $\hat{c}$ indicates a centrifugal force and a Coriolis force, and $\hat{g}$ indicates a gravity term.

The external torque ($\hat{\tau}$) may be calculated by modeling of friction, backlash, and harness torsion of a mechanical component. For example, when a mechanical component (for example, friction) is modeled, the external torque ($\hat{\tau}$) is calculated by Equation (4) below rather than Equation (3).

[Math. 4]

$$\hat{\tau}=\hat{M}(q)\ddot{q}+\hat{c}(q,\dot{q})+\hat{g}(q)+\hat{h}(q) \quad (4)$$

A term having $\hat{h}$ in Equation (4) indicates a friction term. When a coulomb friction term is $F_c$, a sign function is sgn( ), and viscous friction is D, the friction term is calculated by Equation (5) below.

[Math. 5]

$$\hat{h}(q)=F_c\cdot\text{sgn}(\dot{q})+D\dot{q} \quad (5)$$

The external torque ($\hat{\tau}$) may be calculated by modeling of a spring constant of an elastic actuator, series elastic actuator (SEA). The elastic actuator is a mechanism provided with a spring which is an elastic member between a motor and a link, for example. When a motor-side joint angle is θ, a joint stiffness of a spring is K, and a link-side joint angle is q, the external torque ($\hat{\tau}$) is calculated by Equation (6) below rather than Equations (3) and (4).

[Math. 6]

$$\hat{\tau}=J\ddot{\theta}+h(q)+K(\theta-q) \quad (6)$$

(5) Processing Block 216-1B

The processing block 216-1B performs a process of calculating the estimated external torque $\tau_{ex}$. For example, the processing block 216-1B calculates the external torque $\tau_{ex}$ by subtracting the external torque ($\hat{\tau}$) calculated by the processing block 216-1A from the external torque $\tau_e$ detected by the torque sensor 114. The processing block 216-1B outputs the calculated external torque ($\hat{\tau}$) to the processing block 216-1C and the processing block 218-1C.

(6) Processing Block 216-1C

The processing block 216-1C performs a process of calculating the estimated external force $F_{ex}$. For example, the processing block 216-1C calculates the estimated external force $F_{ex}$ from the estimated external torque $\tau_{ex}$ using the Jacobian matrix J. The processing block 216-1C outputs the calculated estimated external force $F_{ex}$ to the processing block 218-1A.

(7) Processing Block 218-1A

The processing block 218-1A performs a process of calculating the difference e. For example, the processing block 218-1A calculates the difference a by subtracting the external force $F_s$ detected by the force sensor 112 from the estimated external force $F_{ex}$ input from the processing block 216-1C. The processing block 218-1A outputs the calculated difference C to the processing block 218-1B.

(8) Processing Block 218-1B

The processing block 218-1B performs a process of adjusting the gain α. For example, the processing block 218-1B adjusts the gain α on the basis of the difference ε calculated by the processing block 218-1A. The processing block 218-1B outputs the gain α after adjustment to the processing block 218-1C.

(9) Processing Block 218-1C

The processing block 218-1C performs a process of applying the gain α to the estimated external torque $\tau_{ex}$. For example, the processing block 218-1C calculates $\alpha\tau_{ex}$ by multiplying the estimated external torque $\tau_{ex}$ input from the processing block 216-1B by the gain α adjusted by the processing block 218-1B. The processing block 218-1C outputs the calculated $\alpha\tau_{ex}$ to the correction unit 219-1.

(10) Processing Block 220-1A

The processing block 220-1A performs a process related to VA control. For example, when the final torque command value τ corrected on the basis of the external torque detected by the torque sensor 114 is input from the correction unit 219-1, the processing block 220-1A controls the operation of the joint portion 102 so that the arm device 100 (the control target 20) performs a passive operation.

Hereinabove, a configuration example according to the first embodiment has been described with reference to FIGS. 3 to 8. Next, an operation example according to the first embodiment will be described.

<2. 2. Operation Example>

Figure 9:
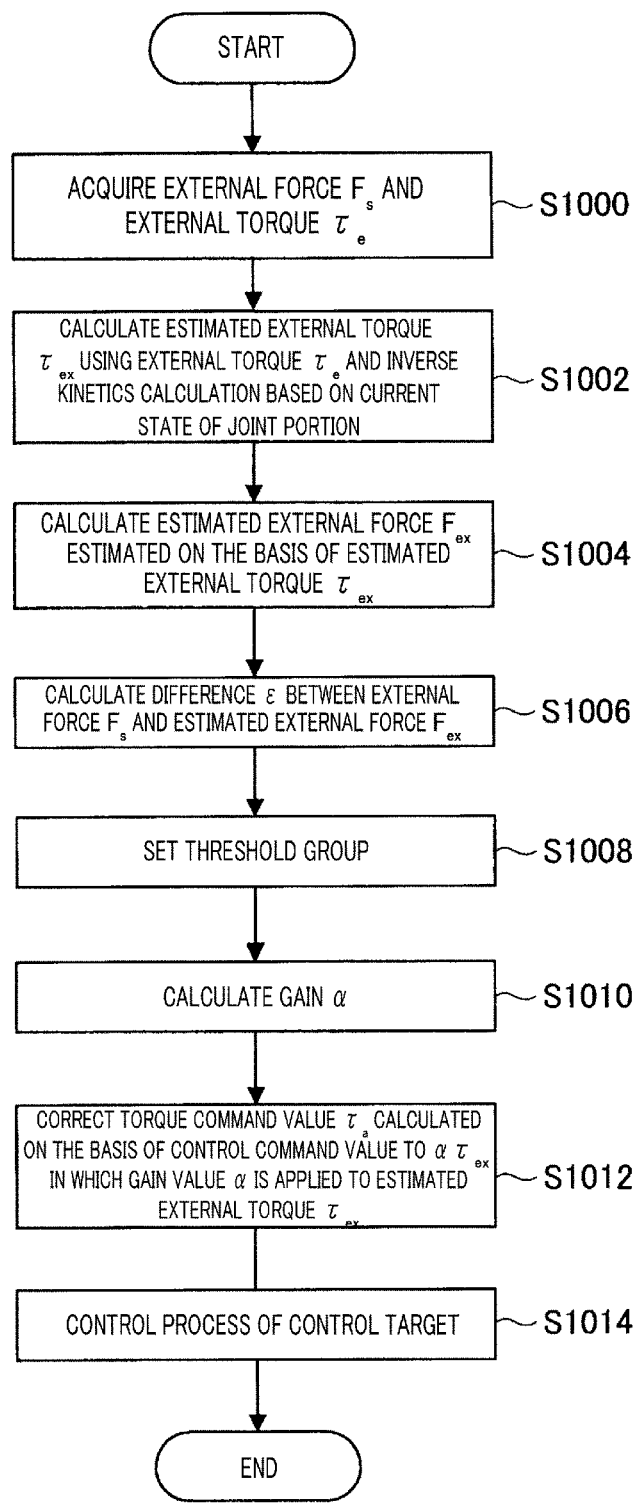
FIG. 9 is a flowchart illustrating an operation example of a control device according to the embodiment.

Hereinafter, an operation example of the control device 200 according to the first embodiment will be described with reference to FIG. 9. FIG. 9 is a flowchart illustrating an operation example of the control device 200 according to the first embodiment.

As illustrated in FIG. 9, first, the control device 200 acquires the external force $F_s$ detected by the force sensor 112 and the external torque $\tau_e$ detected by the torque sensor 114 (step S1000). The control device 200 calculates the estimated external torque $\tau_{ex}$ using the external torque $\tau_e$ and inverse kinetics calculation based on a current state of the joint portion 102 (step S1002). The control device 200 calculated the estimated external force $F_{ex}$ estimated on the basis of the estimated external torque $\tau_{ex}$ (step S1004). The control device 200 calculates the difference ε between the calculated estimated external force $F_{ex}$ and the external force $F_s$ detected by the force sensor 112 (step S1006).

After calculating the difference ε, the control device 200 sets the threshold group of the difference ε (step S1008). In step S1008, the threshold group may be determined on the basis of any one of distance information d, a command for the arm device 100, and a past operation history of the arm device 100. The control device 200 sets the gain α corresponding to the calculated difference ε on the basis of the set threshold group of the difference ε (step S1010). After setting the gain α, the control device 200 corrects the torque command value $\tau_a$ calculated on the basis of the control command value to $\alpha\tau_{ex}$ in which the gain α is applied to the estimated external torque $\tau_{ex}$ and calculates the final torque command value τ (step S1012). The control device 200 controls the operation of the arm device 100 (step S1014) by operating the joint portion 102 of the arm device 100 which is a control target on the basis of the final torque command value τ and ends the processing.

Hereinabove, an operation example of the control unit 210-1 according to the first embodiment will be described with reference to FIG. 9.

Hereinabove, the first embodiment has been described with reference to FIGS. 3 to 9. Next, second to fourth embodiments will be described. The control system 10 according to the second to fourth embodiments described later is different from the control system 10 of the first embodiment only in the configuration of the processing block of the control unit 210. Therefore, in the following description, the configuration of the processing block of the control unit 210 which is a matter different from that of the first embodiment will be mainly described, and the detailed description of matters overlapping the first embodiment will be omitted.

3. SECOND EMBODIMENT

Hereinafter, the second embodiment will be described with reference to FIG. 10. In the above-described first embodiment, an example in which a high-accuracy mode is realized by impedance control using data detected by a force sensor will be described. In the second embodiment, an example in which a high-accuracy mode is realized by proportional integral differential (PID) control will be described. In the second embodiment, processing different from that of the first embodiment is executed in a processing block of a Cartesian space control unit 212-2 of a control unit 210-2. Hereinafter, the different processing will be mainly described.

3. 1. Configuration Example

<3. 1. 1. Configuration Example of Control System 10>

A configuration of the control system 10 according to the second embodiment is the same as the configuration of the control system 10 described in the first embodiment. Therefore, in this section, the detailed description of the configuration of the control system 10 will be omitted.

<3. 1. 2. Functional Configuration Example of Control Unit 210-2>

A functional configuration of the control unit 210-2 according to the second embodiment is the same as the functional configuration of the control unit 210-1 described in the first embodiment. Therefore, in this section, the detailed description of the functional configuration of the control unit 210-2 will be omitted.

<3. 1. 3. Processing Block Configuration Example of Control Unit 210-2>

Figure 10:
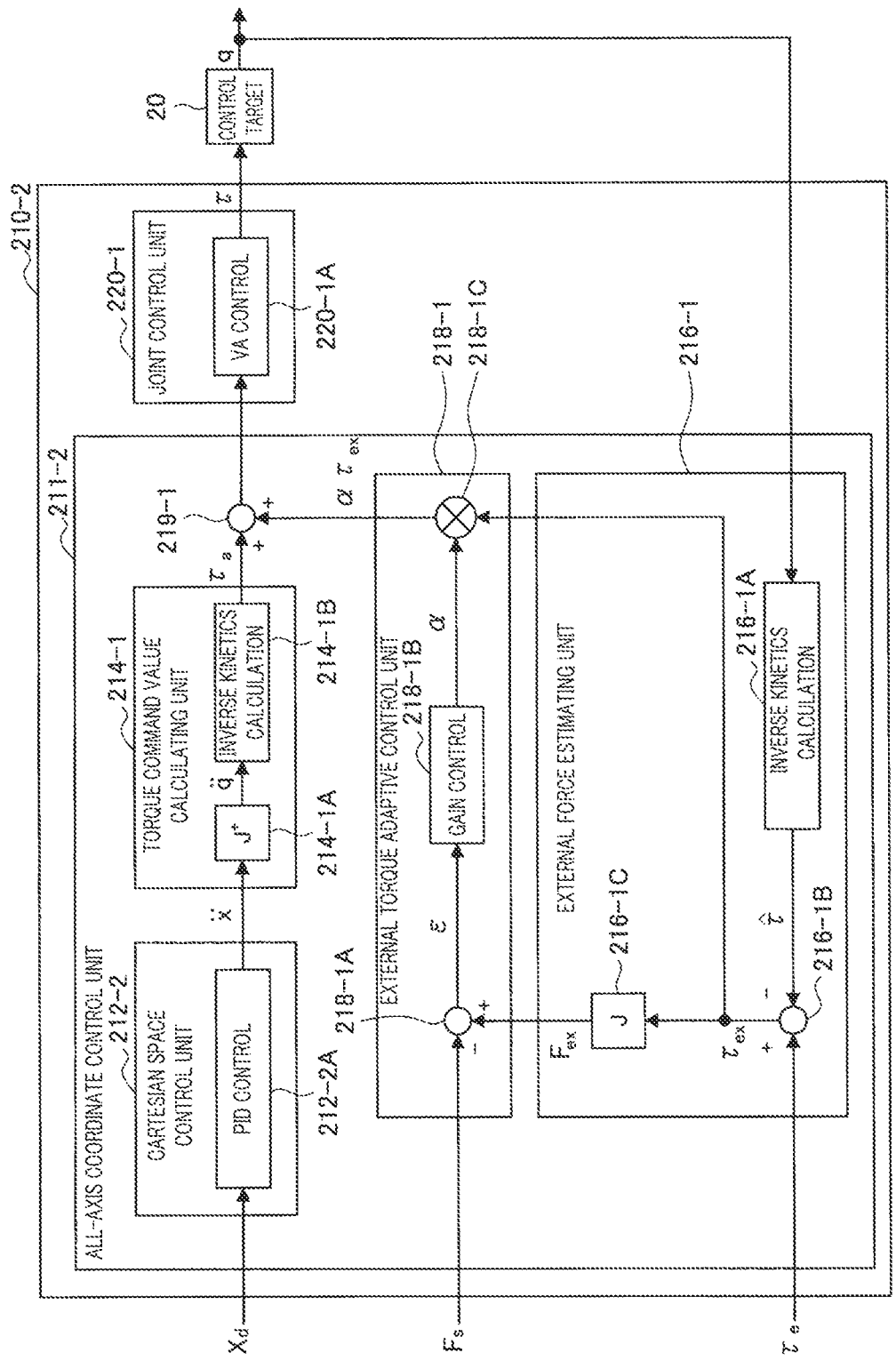
FIG. 10 is a block diagram illustrating a configuration example of processing blocks of a control unit according to a second embodiment.

FIG. 10 is a block diagram illustrating a configuration example of a processing block of the control unit 210-2 according to the second embodiment. As illustrated in FIG. 10, the processing block configuration of the control unit 210-2 according to the second embodiment is different from that of the first embodiment in that the processing of the processing block 212-2A is executed in the Cartesian space control unit 212-2. Therefore, in this section, the processing block 212-2A will be described only, and the detailed description of the other processing blocks will be omitted.

The processing block 212-2A performs a process of calculating a command acceleration value (the second-order differential value of the current position attitude x) in a Cartesian space. For example, the processing block 212-2A calculates the command acceleration value (the second-order differential value in the current position attitude x) in a Cartesian space on the basis of the target position attitude $x_d$. When the current position attitude of the arm device 100 is x, the command acceleration value (the second-order differential value of the current position attitude x) in a Cartesian space is represented by Equation (7) below.

[Math. 7]

$$\ddot{x} = K_p(x - x_d) + K_d \frac{d(x - x_d)}{dt} + K_i \int (x - x_d) dt \qquad (7)$$

In Equation (7), $K_p$ indicates a proportional gain of PID control, $K_d$ indicates a differential gain of PID control, and $K_i$ indicates an integral gain of PID control. When Equation (7) is simplified using $e=x-x_d$, s indicating differentiation, and 1/s indicating integration, Equation (7) is represented as Equation (8) below.

[Math. 8]

$$\ddot{x} = K_p + K_d s + \frac{K_d}{s} \qquad (8)$$

The processing block 212-2A calculates the command acceleration value (the second-order differential value of the current position attitude x) in a Cartesian space according to Equation (8). The processing block 212-2A outputs the calculated command acceleration value (the second-order differential value in the current position attitude x) in the Cartesian space to the processing block 214-1A.

As described above, an example in which a high-accuracy mode is realized by impedance control in the first embodiment, and an example in which a high-accuracy mode is realized by PID control in the second embodiment have been described. However, a control method of the high-accuracy mode is not limited to the above-described examples. For example, the high-accuracy mode may be controlled by hybrid control.

Hereinabove, a configuration example according to the second embodiment has been described with reference to FIG. 10. Next, an operation example according to the second embodiment will be described.

3. 2. Operation Example

The operation of the control device 200 according to the second embodiment is the same as the operation of the control device 200 described in the first embodiment. Therefore, in this section, the detailed description of the operation example of the control device 200 will be omitted.

Hereinabove, the second embodiment has been described with reference to FIG. 10. Next, a third embodiment will be described.

4. THIRD EMBODIMENT

Hereinafter, a third embodiment will be described with reference to FIG. 11. In the first embodiment, an example in which VA control is used for control of the high-safety model has been described. In the third embodiment, an example in which VA control is used for position control of the high-accuracy mode will be described. In the third embodiment, processing different from that of the first embodiment is executed in the processing block of a joint angle command value calculation unit 214-3 of a control unit 210-3, the processing block of an external force estimating unit 216-3, and the processing block of an external torque adaptive control unit 218-3. Hereinafter, the different processing will be mainly described.

4. 1. Configuration Example

<4. 1. 1. Configuration Example of Control System 10>

The configuration of the control system 10 according to the third embodiment is the same as the configuration of the control system 10 described in the first embodiment. Therefore, in this section, the detailed description of the configuration of the control system 10 will be omitted.

<4. 1. 2. Functional Configuration Example of Control Unit 210-3>

A functional configuration of the control unit 210-3 according to the third embodiment is the same as the functional configuration of the control unit 210-1 described in the first embodiment. Therefore, in this section, the detailed description of the functional configuration of the control unit 210-3 will be omitted.

<4. 1. 3. Configuration Example of Processing Block of Control Unit 210-3>

Figure 11:
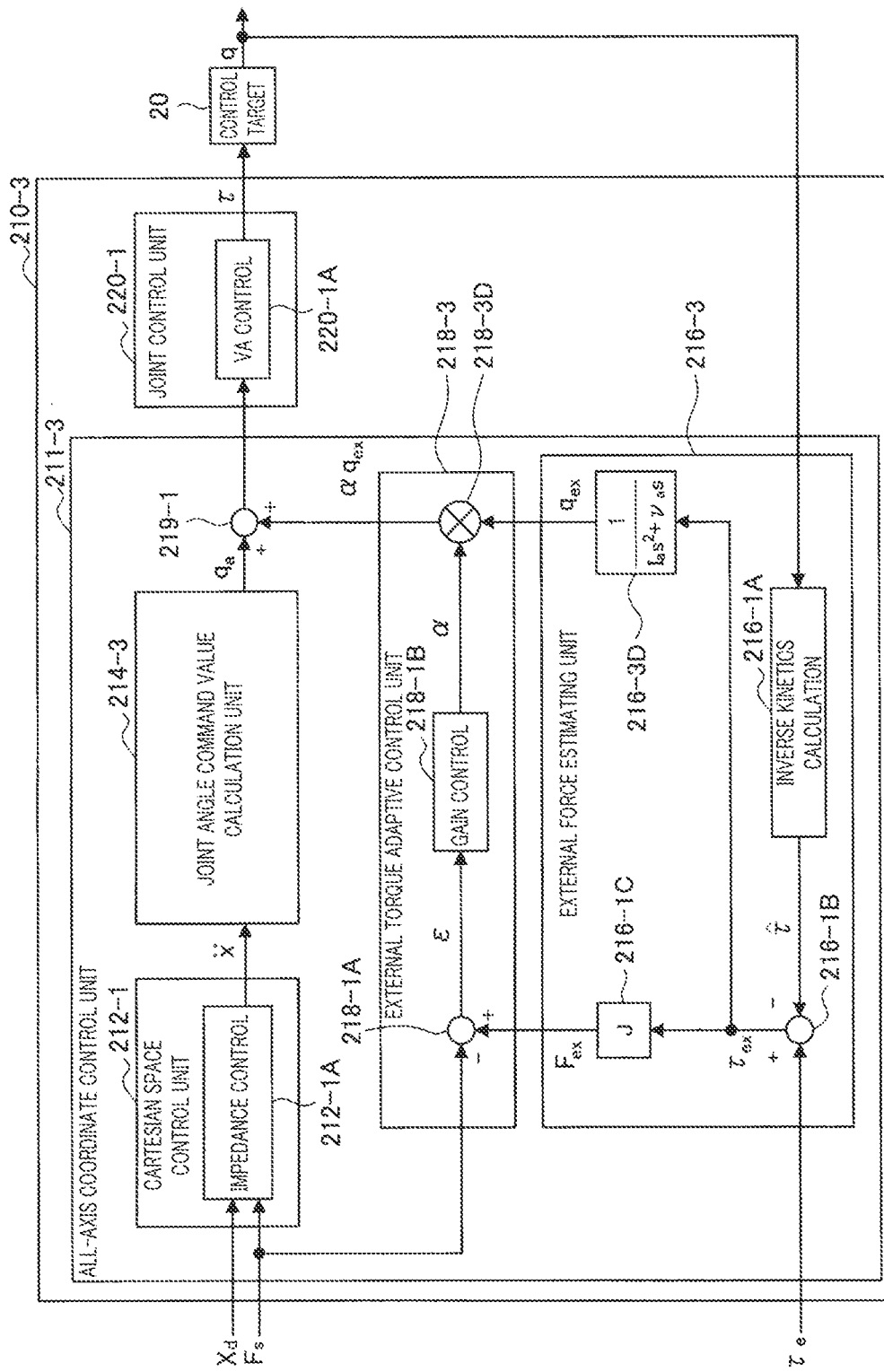
FIG. 11 is a block diagram illustrating a configuration example of processing blocks of a control unit according to a third embodiment.

FIG. 11 is a block diagram illustrating a configuration example of the processing block of the control unit 210-3 according to the third embodiment. As illustrated in FIG. 11, the processing block configuration of the control unit 210-3 according to the third embodiment is different from that of the first embodiment in that the processing block includes a joint angle command value calculation unit 214-3 rather than the torque command value calculating unit 214-1. Moreover, the processing block configuration of the control unit 210-3 is different from that of the first embodiment in that processing of a processing block 216-3D in addition to the processing blocks 216-1A to 216-1C is executed in an external force estimating unit 216-3. Furthermore, a processing block 218-3D in the external torque adaptive control unit 218-3 of the processing block configuration of the control unit 210-3 is different from that of the first embodiment. Therefore, in this section, the joint angle command value calculation unit 214-3, the processing block 216-3D, and the processing block 218-3D will be described only, and the detailed description of the other processing blocks will be omitted.

(1) Joint Angle Command Value Calculation Unit 214-3

The joint angle command value calculation unit 214-3 performs a process of calculating a joint angle command value $q_a$. First, the joint angle command value calculation unit 214-3 performs an integration process. For example, the joint angle command value calculation unit 214-3 calculates a first-order differential value of the current position attitude x by integrating the command acceleration value (the second-order differential value of the current position attitude x) in a Cartesian space input from the processing block 212-1A. Subsequently, the joint angle command value calculation unit 214-3 calculates the current position attitude x by integrating the first-order differential value of the current position attitude x. Subsequently, the joint angle command value calculation unit 214-3 calculates the joint angle command value $q_a$ by performing inverse kinematics (IK) on the basis of the current position attitude x, For example. The joint angle command value calculation unit 214-3 outputs the calculated joint angle command value $q_a$ to the correction unit 219-1.

(3) Processing Block 216-3D

The processing block 216-3D performs a process of calculating the joint angle $q_{ex}$. For example, the processing block 216-3D calculates an estimated joint angle $q_{ex}$ using Equation (9) below. The processing block 216-3D outputs the calculated estimated joint angle $q_{ex}$ to the processing block 218-3D. In Equation (9), $I_a$ is an imaginary inertia of the joint portion 102 and va is an imaginary viscosity coefficient of the inside of the joint portion 102.

[Math. 9]

$$q_{ex} = \frac{1}{I_a s^2 + v_a s} \qquad (9)$$

(4) Processing Block 218-3D

The processing block 218-3D performs a process of applying the gain α to the estimated joint angle $q_{ex}$. For example, the processing block 218-3D calculates $αq_{ex}$ by multiplying the estimated joint angle $q_{ex}$ input from the processing block 216-3D by the gain α adjusted by the processing block 218-1B. The processing block 218-3D outputs the calculated $αq_{ex}$ to the correction unit 219-1.

Hereinabove, the configuration example according to the third embodiment has been described with reference to FIG. 11. As described above, the control unit 210-3 according to the third embodiment is different from the control unit 210-3 according to the other embodiment and performs control of a control target on the basis of an angle rather than a torque. Next, an operation example according to the third embodiment will be described.

4. 2. Operation Example

The operation of the control device 200 according to the third embodiment is the same as the operation of the control device 200 described in the first embodiment. Therefore, in this section, the detailed description of the operation example of the control device 200 will be omitted.

Hereinabove, the third embodiment has been described with reference to FIG. 11. Next, a fourth embodiment will be described.

5. FOURTH EMBODIMENT

Hereinafter, a fourth embodiment will be described with reference to FIG. 12. In the first embodiment, an example in which the estimated external force $F_{ex}$ calculated on the basis of the external force $F_s$ detected by the force sensor 112 and the external torque $\tau_e$ detected by the torque sensor 114 is input to the external torque adaptive control unit 218-1 has been described. In the fourth embodiment, an example in which peripheral information before the external force $F_s$ is applied to the arm device 100 is also input to the external torque adaptive control unit 218-4 will be described. In the fourth embodiment, processing different from that of the first embodiment is executed in the processing block of an external torque adaptive control unit 218-4 of a control unit 210-4. Hereinafter, the different processing will be mainly described.

5. 1. Configuration Example

<5. 1. 1. Configuration Example of Control System 10>

The configuration of the control system 10 according to the fourth embodiment is the same as the configuration of the control system 10 described in the first embodiment. Therefore, in this section, the detailed description of the configuration of the control system 10 will be omitted.

<5. 1. 2. Functional Configuration Example of Control Unit 210-4>

The functional configuration of the control unit 210-4 according to the fourth embodiment is the same as the functional configuration of the control unit 210-1 described in the first embodiment. Therefore, in this section the detailed description of the functional configuration of the control unit 210-4 will be omitted.

<5. 1. 3. Configuration Example of Processing Block of Control Unit 210-4>

Figure 12:
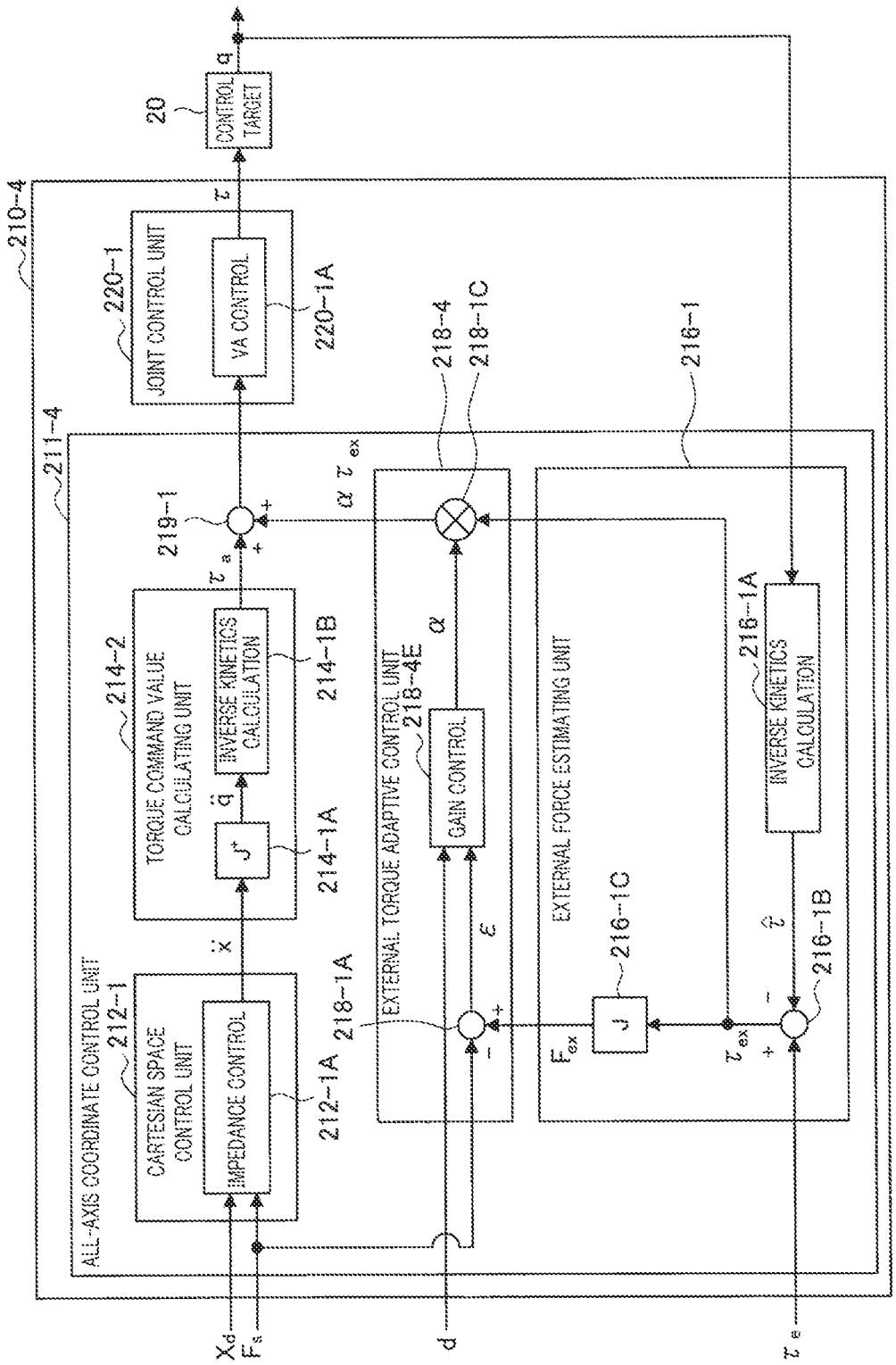
FIG. 12 is a block diagram illustrating a configuration example of processing blocks of a control unit according to a fourth embodiment.

FIG. 12 is a block diagram illustrating a configuration example of a processing block of the control unit 210-4 according to the fourth embodiment. As illustrated in FIG. 12, the processing of a processing block 218-4E of an external torque adaptive control unit 218-4 of the processing block configuration of the control unit 210-4 according to the fourth embodiment is different from that of the first embodiment. Therefore, in this section, the processing block 218-4E will be described only, and the detailed description of the other processing blocks will be omitted.

The processing block 218-4E performs a process of adjusting the gain $\alpha$. For example, the processing block 218-4E adjusts the gain $\alpha$ on the basis of distance information d input from the outside in addition to the difference $\varepsilon$ input from the processing block 218-1A. The processing block 218-4E outputs the adjusted gain $\alpha$ to the processing block 218-1C.

The distance information d is detected by the sensor unit 110 before the external force $F_s$ is applied to the arm device 100, for example, and is input to the processing block 218-4E. For example, the sensor unit 110 that detects the distance information d is a vision sensor such as a stereo camera and a monocular camera, a photo-reflector, and a distance sensor such as a time of flight (ToF) sensor. Moreover, the sensor unit 110 may be a ranging device such as a 3D LiDAR (laser imaging detection and ranging) and a laser range finder. Specifically, the distance information d is information indicating the distance from the arm device 100 to a surrounding person or object. The processing block 218-4E can adjust the gain $\alpha$ such that avoidance of a person or an object is taken into consideration by knowing the distance to a person or an object in advance. Due to this, the arm device 100 can avoid unnecessary contact by performing an operation that takes the distance to a person or an object into consideration and can improve the stability of an operation further.

Hereinabove, a configuration example according to the fourth embodiment will be described with reference to FIG. 12. Next, an operation example according to the fourth embodiment will be described.

<5. 2. Operation Example>

The operation of the control device 200 according to the fourth embodiment is the same as the operation of the control device 200 described in the first embodiment. Therefore, in this section, the detailed description of the operation example of the control device 200 will be omitted.

Hereinabove, the fourth embodiment has been described with reference to FIG. 12. Next, a hardware configuration of the control device 200 and the arm device 100 according to an embodiment of the present invention will be described.

6. HARDWARE CONFIGURATION EXAMPLE

Hereinafter, a hardware configuration example of the control device 200 and the arm device 100 according to an embodiment of the present disclosure will be described with reference to FIG. 12. FIG. 12 is a block diagram illustrating a hardware configuration example of the control device 200 and the arm device 100 according to an embodiment of the present disclosure. The control process of the control system 10 according to the present embodiment is realized by combination of software and hardware described later.

As illustrated in FIG. 12, the control device 900 includes a central processing unit (CPU) 901, a read only memory (ROM) 903, and a random access memory (RAM) 905. Further, the control device 900 includes a host bus 907, a bridge 909, an external bus 911, an interface 913, an input device 915, an output device 917, a storage device 919, a drive 921, a connection port 923, and a communication device 925. The hardware configuration illustrated herein is an example and some of the constituent components may be omitted. Moreover, the hardware configuration may further include constituent components other than the constituent components illustrated herein.

(CPU 901, ROM 903, RAM 905)

The CPU 901 functions as an arithmetic processing unit or a control device, for example, and controls an entire operation or a part of the operation of the constituent components on the basis of various programs recorded in the ROM 903, the RAM 905, or the storage device 919. The ROM 903 is a unit that stores programs read into the CPU 901 and data and the like used for calculation. The RAI 905 temporarily or permanently stores programs read into the CPU 901 and various parameters and the like which vary appropriately during the execution of the programs. The CPU 901, the ROM 903, and the RAM 905 are connected to each other by the host bus 907 configured as a CPU bus or the like. The CPU 901, the ROM 903, and the RAM 905 can realize the function of the control unit 210-1 described with reference to FIG. 3 by cooperation with software, for example.

(Host Bus 907, Bridge 909, External Bus 911, Interface 913)

The CPU 901, the ROM 903, and the RAM 905 are connected to each other via the host bus 907 capable of transmitting data at a high speed, for example. On the other hand, the host bus 907 is connected to the external bus 911 of which the data transmission speed is relatively slow via the bridge 909, for example. Moreover, the external bus 911 is connected to various constituent components via the interface 913.

(Input Device 915)

The input device 915 is realized as a device to which information is input by a user, such as, for example, a mouse, a keyboard, a touch panel, buttons, a microphone, a switch, and a lever. Moreover, the input device 915 may be a remote control device using, for example, infrared light or other radio waves, or may be an external connection device such as a mobile phone or a PDA compatible with the operation of the control device 900. The input device 915 may include an input control circuit that generates an input signal on the basis of information input by the user using the input unit, for example, and outputs the input signal to the CPU 901. The user of the control device 900 inputs various pieces of data to the control device 900 and instructs the control device 900 to perform a processing operation by operating the input device 915.

In addition, the input device 915 may be configured as a device that detects information related to a user. For example, the input device 915 may include various sensors such as an image sensor (for example, a camera), a depth sensor (for example, a stereo camera), an acceleration sensor, a gyro sensor, a geomagnetic sensor, an optical sensor, a sound sensor, a ranging sensor, and a force sensor. Moreover, the input device 915 may acquire information on the state of the control device 900, such as the attitude or the moving speed of the control device 900 and information on the surrounding environment of the control device 900, such as the surrounding brightness or noise of the control device 900. Furthermore, the input device 915 may include a GNSS module that receives a GNSS signal (for example, a GPS signal from a global positioning system (GPS) satellite) from a global navigation satellite system (GNSS) satellite and measures position information including the latitude, longitude, and altitude of the device. Furthermore, as for the position information, the input device 915 may detect the position by Wi-Fi (registered trademark), transmission and reception to and from a mobile phone, a PHS, a smartphone, or the like, near-field communication, or the like. The input device 915 can realize the function of the sensor unit 110 described with reference to FIG. 3, for example.

(Output Device 917)

The output device 917 is formed by a device capable of visually or aurally notifying the user of acquired information. Examples of such a device include a display device such as a CRT display device, a liquid crystal display device, a plasma display device, an EL display device, a laser projector, an LED projector, or a lamp, a sound output device such as a speaker and a headphone, a printer device and the like. The output device 917 outputs results acquired through various processes performed by the control device 900, for example. Specifically, the display device visually displays results acquired through various processes performed by the control device 900 in various forms such as text, images, tables and graphs. On the other hand, the sound output device converts audio signals including reproduced sound data, audio data and the like into analog signals and aurally outputs the analog signals.

(Storage Device 919)

The storage device 919 is a device for data storage, formed as an example of a storage unit of the control device 900. For example, the storage device 919 is realized by a magnetic storage device such as an HDD, a semiconductor storage device, an optical storage device, a magneto-optical storage device or the like. The storage device 919 may include a storage medium, a recording device for recording data on the storage medium, a reading device for reading data from the storage medium, a deletion device for deleting data recorded on the storage medium and the like. The storage device 919 stores programs and various types of data executed by the CPU 901, various types of data acquired from the outside and the like. The storage device 919 can realize the function of the storage unit 230 described with reference to FIG. 3, for example.

(Drive 921)

The drive 921 is a reader/writer for storage media and is provided in or externally attached to the control device 900. The drive 921 reads information recorded on a removable storage medium mounted thereon such as a magnetic disk, an optical disc, a magneto-optical disc or a semiconductor memory and outputs the information to the RAM 905. In addition, the drive 921 can write information on the removable storage medium.

(Connection Port 923)

The connection port 923 is a port for connecting an external connection device such as, for example, a universal serial bus (USB) port, an IEEE1394 port, a small computer system interface (SCSI) port, an RS-232C port, or an optical audio terminal.

(Communication Device 925)

The communication device 925 is a communication interface configured as, for example, a communication device for connection to a network 930. The communication device 925 is, for example, a wired or wireless local area network (LAN), long term evolution (LTE), Bluetooth (registered trademark), a communication card for wireless USB (WUSB), or the like. Moreover, the communication device 925 may be a router for optical communication, a router for asymmetric digital subscriber line (ADSL), a modem for various communications, or the like. The communication device 925 can transmit and receive signals and the like using a predetermined protocol such as TCP/IP on the Internet and with other communication devices, for example.

Further, the network 930 is a wired or wireless transmission path of information transmitted from devices connected to the network 930. For example, the network 930 may include a public circuit network such as the Internet, a telephone circuit network or a satellite communication network, various local area networks (LANs) including Ethernet (registered trademark), a wide area network (WAN) and the like. In addition, the network 930 may include a dedicated circuit network such as an internet protocol-virtual private network (IP-VPN).

Figure 13:
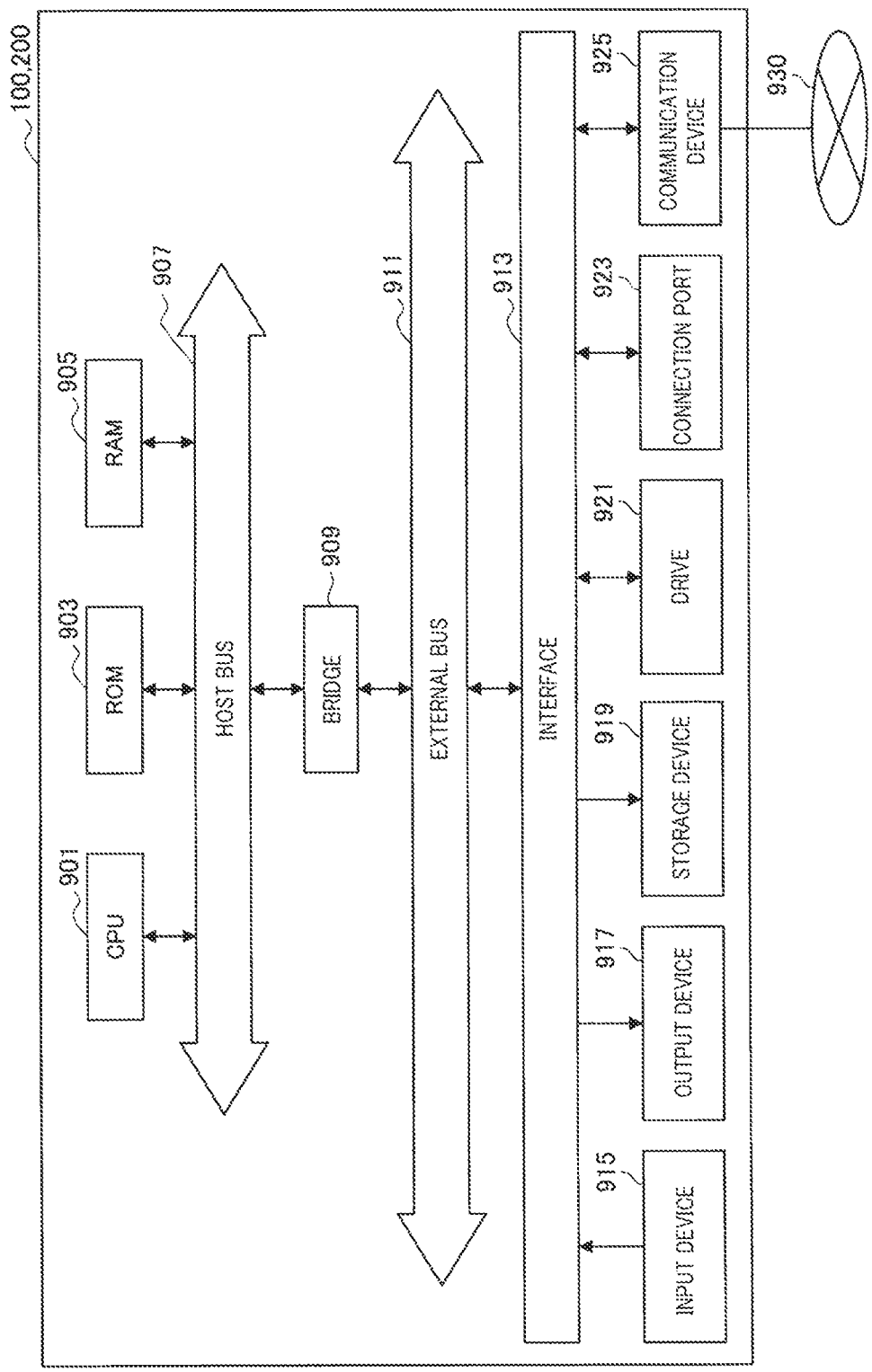
FIG. 13 is a block diagram illustrating a hardware configuration example of an arm device and a control device according to an embodiment of the present disclosure.

Hereinabove, a hardware configuration example of the control device 200 and the arm device 100 according to the present embodiment has been described with reference to FIG. 13. The respective constituent components may be realized using universal members, or may be realized by hardware specialized to the functions of the respective constituent components. Therefore, hardware configurations to be used may be changed appropriately depending on a technical level when the embodiment is implemented.

7. CONCLUSION

As described above, the control device 200 according to the embodiment of the present disclosure acquires an external force detected by the force sensor provided in the control target. Moreover, the control device 200 acquires a torque detected by a torque sensor provided in a movable portion of a control target that operates the force sensor. Subsequently, the control device 200 calculates an estimated external force estimated to be applied to the control target on the basis of the acquired torque. The control device 200 compares the external force and the estimated external force and corrects the torque command value calculated on the basis of the external force on the basis of the comparison result to control the operation of the control target.

As described above, the control device 200 can calculate the estimated external force estimated to be applied to the control target on the basis of the external force detected by the force sensor and the torque detected by the torque sensor. Moreover, the control device 200 can correct the torque command value by comparing the estimated external force and the external force detected by the force sensor to control the operation of the control target. That is, the control device 200 can correct the torque command value according to the torque detected by the torque sensor and control the operation of the control target according to the corrected torque command value.

Therefore, it is possible to provide new and improved control device, control method, and control system capable of controlling the operation of the control target according to the detected external force.

While the preferred embodiments of the present disclosure have been described above with reference to the accompanying drawings, the technical scope of the present disclosure is not limited to the above examples. A person skilled in the art may find various alterations and modifications within the scope of the technical idea described in the claims, and it should be understood that they will naturally come under the technical scope of the present disclosure.

For example, the devices described in this specification may be realized as a single device, and some or all devices may be realized as individual devices. For example, the arm device 100 and the control device 200 illustrated in FIG. 3 may also be realized as a single device. Furthermore, for example, the control device 200 illustrated in FIG. 3 may be realized as a server device connected to the arm device 100 by a network or the like.

Note that the processing described using the flowcharts in this specification may not necessarily be executed in the illustrated order. Some processing steps may be executed in parallel. Further, some of additional steps may be adopted, and some processing steps may be omitted.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Note that, the following configurations also fall within the technical scope of the present disclosure.

(1)
A control device comprising: a control unit that compares a first external force detected by a force sensor provided in a control target and a second external force estimated on the basis of a torque detected by a torque sensor provided in a movable portion of the control target, the movable portion enabling the force sensor to be movable, and corrects the torque command value on the basis of a result of the comparison to control an operation of the control target.

(2)
The control device according to (1), wherein the control unit adjusts a gain on the basis of a difference between the first external force and the second external force extracted by the comparison and applies the gain to the torque command value to control switching between a first mode where the control target operates with priority on safety and a second mode where the control target operates with priority on accuracy.

(3)
The control device according to (2), wherein the control unit switches between the first mode and the second mode according to an application state of a third external force applied to the control target on the basis of the difference.

(4)
The control device according to (3), wherein the control unit sets the first mode when the application state is in a state where the expected third external force is applied to the control target.

(5)
The control device according to (4), wherein the control unit sets the first mode by adjusting the gain so as to approach a first value.

(6)
The control device according to any one of (3) to (5), wherein the control unit sets the second mode when the application state is a state where the unexpected third external force is applied to the control target.

(7)
The control device according to (6), wherein the control unit sets the second mode by adjusting the gain so as to approach a second value.

(8)
The control device according to any one of (2) to (7), wherein the control unit continuously switches between the first mode and the second mode by continuously changing the gain.

(9)
The control device according to (8), wherein the control unit continuously changes the gain when the difference is a value within a predetermined range.

(10)
The control device according to any one of (2) to (7), wherein the control unit discontinuously switches between the first mode and the second mode by discontinuously changing the gain.

(11)
The control device according to (10), wherein the control unit changes the gain in a step shape depending on whether the difference is equal to or larger than a predetermined threshold.

(12)
The control device according to any one of (2) to (11), wherein the control unit corrects the torque command value on the basis of a value obtained by multiplying an estimated torque estimated on the basis of the torque and an attitude of the control target by the gain.

(13)
The control device according to (12), wherein the control unit estimates the estimated torque by subtracting an external torque which is a torque generated due to only an operation of the control target from the torque.

(14)
The control device according to (13), wherein the control unit calculates the external torque by performing inverse kinetics calculation on the basis of a joint angle of the control target.

(15)
A control method executed by a processor, comprising: comparing a first external force detected by a force sensor provided in a control target and a second external force estimated on the basis of a torque detected by a torque sensor provided in a movable portion of the control target operating the force sensor and correcting the torque command value on the basis of a comparison result to control an operation of the control target.

(16)
A control system comprising: an arm device including a movable portion having an actuator, an arm portion in which a plurality of links are connected by the movable portion, a torque sensor that detects a torque applied to the movable portion, and a force sensor that detects a first external force applied to a tip end of the arm portion; and a control device including a control unit that compares the first external force and a second external force estimated on the basis of the torque and corrects a torque command value on the basis of a comparison result to control an operation of the arm device.

REFERENCE SIGNS LIST

10 Control system
100 Arm device
102 Joint portion
104 Link
106 Tip portion
110 Sensor unit
112 Force sensor
114 Torque sensor
120 Joint operating unit
200 Control device
210 Control unit
211 All-axis coordinated control unit
212 Cartesian space control unit
214 Torque command value calculating unit
216 External force estimating unit
218 External torque adaptive control unit
219 Correction unit
220 Joint control unit
230 Storage unit

The invention claimed is:

1. A control device comprising:
a control unit configured to
compare a first external force detected by a force sensor provided in a first portion of a control target and a second external force estimated on a basis of a torque detected by a torque sensor provided in a movable portion of the control target, the movable portion enabling the force sensor to be movable and being different than the first portion of the control target,
correct a torque command value on a basis of a result of the comparison to control an operation of the control target, and
adjust a gain on a basis of a difference between the first external force and the second external force extracted by the comparison and apply the gain to the torque command value to control switching between a first mode where the control target operates based on the first external force detected by the force sensor and the torque detected by the torque sensor and a second mode where the control target operates based on only the first external force detected by the force sensor,
wherein the control unit is implemented via at least one processor.

2. The control device according to claim 1, wherein the control unit is further configured to switch between the first mode and the second mode according to an application state of a third external force applied to the control target on the basis of the difference.

3. The control device according to claim 2, wherein the control unit is further configured to set the first mode when the application state is in a state where the third external force being expected is applied to the control target.

4. The control device according to claim 3, wherein the control unit is further configured to set the first mode by adjusting the gain so as to approach a first value.

5. The control device according to claim 2, wherein the control unit is further configured to set the second mode when the application state is a state where the third external force being unexpected is applied to the control target.

6. The control device according to claim 5, wherein the control unit is further configured to set the second mode by adjusting the gain so as to approach a second value.

7. The control device according to claim 1, wherein the control unit is further configured to continuously switch between the first mode and the second mode by continuously changing the gain.

8. The control device according to claim 7, wherein the control unit is further configured to continuously change the gain when the difference is a value within a predetermined range.

9. The control device according to claim 1, wherein the control unit is further configured to discontinuously switch between the first mode and the second mode by discontinuously changing the gain.

10. The control device according to claim 9, wherein the control unit is further configured to change the gain in a step shape depending on whether the difference is equal to or larger than a predetermined threshold.

11. The control device according to claim 1, wherein the control unit is further configured to correct the torque command value on a basis of a value obtained by multiplying an estimated torque estimated on a basis of the torque and an attitude of the control target by the gain.

12. The control device according to claim 11, wherein the control unit is further configured to estimate the estimated torque by subtracting an external torque which is a torque generated due to only an operation of the control target from the torque.

13. The control device according to claim 12, wherein the control unit is further configured to calculate the external torque by performing inverse kinetics calculation on a basis of a joint angle of the control target.

14. A control method executed by a processor, comprising:
comparing a first external force detected by a force sensor provided in a first portion of a control target and a second external force estimated on a basis of a torque detected by a torque sensor provided in a movable portion of the control target, the movable portion enabling the force sensor to be movable and being different than the first portion of the control target;
correcting a torque command value on a basis of a comparison result to control an operation of the control target; and adjusting a gain on a basis of a difference between the first external force and the second external force extracted by the comparison and applying the gain to the torque command value to control switching between a first mode where the control target operates based on the first external force detected by the force sensor and the torque detected by the torque sensor and a second mode where the control target operates based on only the first external force detected by the force sensor.

15. A control system comprising:
an arm device including a movable portion having an actuator, an arm portion in which a plurality of links are connected by the movable portion, a torque sensor provided in the movable portion and configured to detect a torque applied to the movable portion, and a force sensor provided in a tip end of the arm portion and configured to detect a first external force applied to the tip end of the arm portion, the tip end of the arm portion being different than the movable portion; and
a control device including a control unit configured to
compare the first external force and a second external force estimated on a basis of the torque,
correct a torque command value on a basis of a comparison result to control an operation of the arm device, and
adjust a gain on a basis of a difference between the first external force and the second external force extracted by the comparison and apply the gain to the torque command value to control switching between a first mode where the arm device operates based on the first external force detected by the force sensor and the torque detected by the torque sensor and a second mode where the arm device operates based on only the first external force detected by the force sensor,
wherein the control unit is implemented via at least one processor.

* * * * *